United States Patent
Miichi

[11] Patent Number: 5,880,745
[45] Date of Patent: Mar. 9, 1999

[54] SMOOTH PRESENTATIONS VIA REMOTE CONTROL OF LIQUID CRYSTAL PROJECTION APPARATUS

[75] Inventor: Katsuhiro Miichi, Kitakatsuragi-gun, Japan

[73] Assignee: Sharp Kabushiki Kaisha, Osaka, Japan

[21] Appl. No.: 938,065

[22] Filed: Sep. 26, 1997

Related U.S. Application Data

[63] Continuation of Ser. No. 299,284, Aug. 31, 1994, abandoned.

[30] Foreign Application Priority Data

Aug. 31, 1993 [JP] Japan .................................. 5-215974

[51] Int. Cl.$^6$ .................. G06T 1/20; G09G 3/36; G03B 21/00
[52] U.S. Cl. ...................... 345/520; 345/526; 345/3; 345/87; 345/156; 353/122
[58] Field of Search ...................... 345/520, 526, 345/504, 503, 156, 179, 182, 3, 87, 88, 903, 104; 353/119, 121, 122

[56] References Cited

U.S. PATENT DOCUMENTS

| | | | |
|---|---|---|---|
| 4,812,034 | 3/1989 | Mochizuki et al. | 353/121 |
| 4,846,694 | 7/1989 | Erhardt. | 345/104 |
| 4,944,578 | 7/1990 | Dension | 345/88 |
| 5,101,197 | 3/1992 | Hix et al. | 345/87 |
| 5,204,768 | 4/1993 | Tsakiris et al. | 359/148 |
| 5,298,892 | 3/1994 | Shapiro et al. | 345/88 |
| 5,302,985 | 4/1994 | Kennedy et al. | 353/122 |
| 5,337,103 | 8/1994 | Gulick | 353/119 |
| 5,369,432 | 11/1994 | Kennedy | 345/88 |
| 5,420,652 | 5/1995 | Fujieda | 369/24 |
| 5,428,417 | 6/1995 | Lichtenstein | 353/122 |

*Primary Examiner*—Raymond J. Bayerl
*Attorney, Agent, or Firm*—David G. Conlin; William J. Daley, Jr.

[57] ABSTRACT

The invention provides a liquid crystal projection apparatus where visual control of an image magnified and projected on a screen can be directly carried out. A remote control signal transmitted from a remote controller is converted to a mouse signal or a keyboard signal corresponding to a personal computer connected with a main body. The converted mouse signal or keyboard signal is inputted into the personal computer through a cable. The personal computer generates an image signal on the basis of the inputted signal and sends the image signal to the main body through a cable. Consequently, an image based on the direction of the remote controller is displayed and the image is magnified and projected on the screen.

19 Claims, 20 Drawing Sheets

Fig. 9
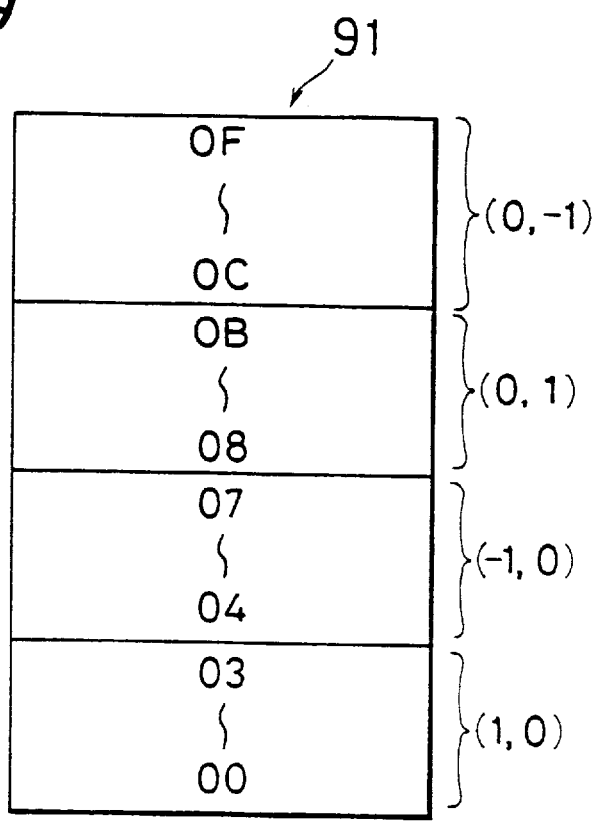
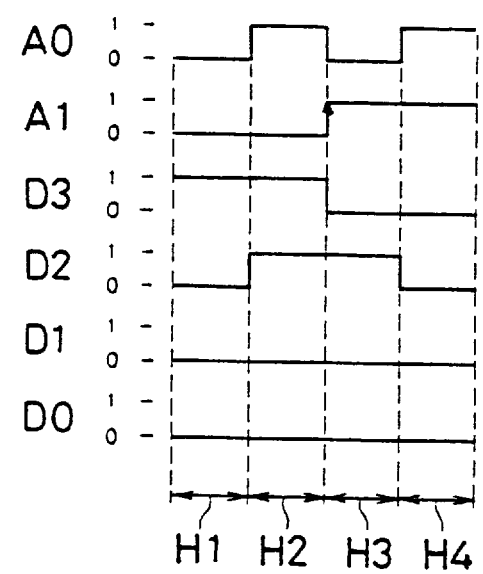
Fig.10A A0
Fig.10B A1
Fig.10C D3
Fig.10D D2
Fig.10E D1
Fig.10F D0

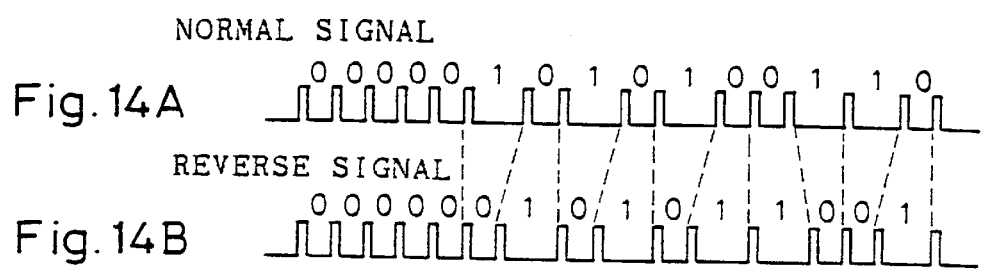
Fig. 14A NORMAL SIGNAL
Fig. 14B REVERSE SIGNAL
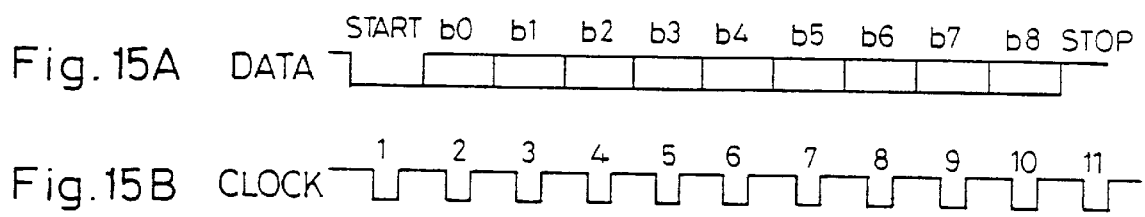
Fig. 15A DATA
Fig. 15B CLOCK

{ (A) XA SIGNAL (YA)
  (B) XB SIGNAL (YB) }

{ (C) XA SIGNAL (YA)
  (D) XB SIGNAL (YB) }

Fig. 28 Prior Art
(A)
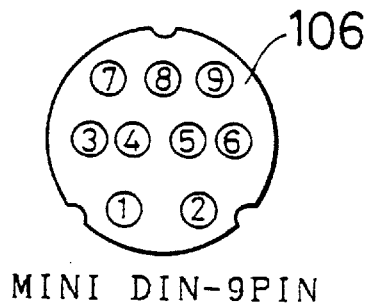
MINI DIN-9PIN
(B)
| Pin No | Signal |
|--------|--------|
| 1 | Vcc |
| 2 | XA |
| 3 | XB |
| 4 | YA |
| 5 | YB |
| 6 | SW-L |
| 7 | (SW-M) |
| 8 | SW-R |
| 9 | GND |
Fig. 29 Prior Art
(A)
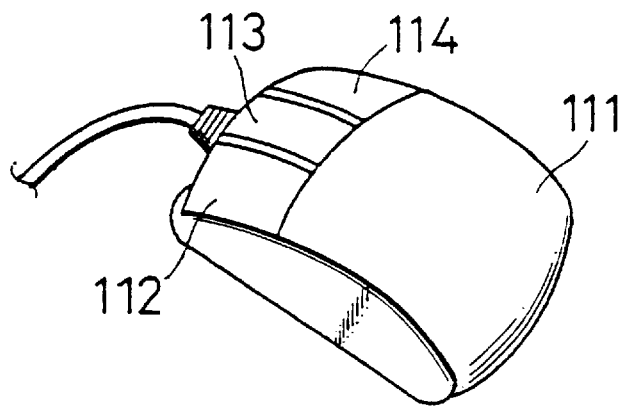
(B)
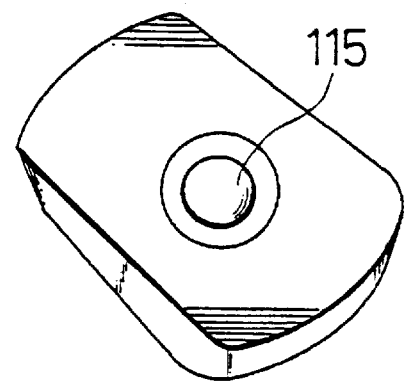

SMOOTH PRESENTATIONS VIA REMOTE CONTROL OF LIQUID CRYSTAL PROJECTION APPARATUS

This application is a continuation of application Ser. No. 08/299,284 filed Aug. 31, 1994, now abandoned.

BACKGROUND OF THE INVENTION

1. Field of the Invention

The present invention relates to a liquid crystal projection apparatus mounted on a panel of an over head projector (OHP).

2. Description of the Related Art

FIG. 25 is a view for explaining an engaged state of a conventional liquid crystal projection apparatus. The apparatus is composed of a main body 100 and a remote controller 105. The main body 100 is mounted on a panel of an OHP 101 in use. The OHP 101 comprises a light source provided below the panel on which the main body 100 is mounted, and a projection lens above the panel, and projects the light from the light source on a specified screen 102 through the projection lens. The main body 100 is realized, for example, by a transmissive type liquid crystal display panel, connected to a personal computer 103 through a cable 104, and displays an image on the basis of image signals from the personal computer 103. The image displayed on the main body 100 is magnified and projected on the screen 102 by the OHF 101.

The personal computer 103 is connected a mouse 110 which inputs mouse signals. The personal computer 103 generates an image signal corresponding with a predetermined mouse signal generated by the operator's mouse operation, and the image signal is given to the main body 100 through the cable 104. The mouse 110 is realized, for example, by the below-mentioned mouse, and the image signal is selected by specifying with a cursor, that is, by moving the cursor displayed on display means provided in the personal computer 103 to a desired position by the use of the mouse 110. Namely, the personal computer 103 generates an image signal based on the predetermined processing at the specified position.

The remote controller 105 constituting the conventional liquid crystal projection apparatus comprises a plurality of buttons and keys, through which the adjustment of display conditions such as horizontal/vertical position and density is carried out.

In the case where such the conventional liquid crystal projection apparatus is used for presentation, the change of projected images, namely, the change of images displayed on the main body 100, is carried out by the presenter's operation of the mouse 110 of the personal computer 103, or by another person's operation thereof.

FIG. 26 is a plan view of the mouse 110 of the prior art. FIGS. 27A–27D are output signal diagrams showing a moving direction of the mouse 110 of FIG. 26. FIG. 28A is a view of a pin connection arrangement of a connector 106 which connects the mouse 110 of FIG. 26 with the personal computer 103, and FIG. 28B is a view of pin output signals of the connector 106.

As shown in FIG. 26, the mouse 110 can detect four moving directions in indicated by arrows X1, X2, Y1, Y2. For example, the moving direction and moving amount are detected by detecting which direction and how many units the mouse has rotated, on the basis of unit rotation of a mouse ball 110a which is possessed by the mouse. FIG. 27A, 27B show the waveform of a signal which is detected when the mouse is moved toward a plus direction, namely, X1 or Y1 direction (one direction) by unit length. On the other hand, FIG. 27C, 27D show the wave form of a signal which is detected when the mouse is moved toward a minus direction, namely, X2 or Y2 direction (the other direction) by unit length. The rotation data of the mouse 110 is transmitted to the personal computer 103 through the connector 106, for example, whose pin arrangement is as shown in FIGS. 28A, 28B. A source voltage signal is transmitted from a pin No. 1, the rotation data is transmitted from pins Nos. 2–5, and a select signal from a button and a key provided in the mouse 110 is transmitted from pins Nos. 6–8. A pin No. 9 is grounded.

FIGS. 29A, 29B are a top and a bottom perspective view of a mouse 111 of other type, respectively. The mouse 111 comprises a left switch 112, a middle switch 113, and a right switch 114 for conducting the selection of icons and cells, is provided with a mouse ball 115 on the rear thereof.

FIG. 30 is a plan view of a remote controller 105 of the prior art. The remote controller 105 comprises a plurality of keys 116–120, and a transmitting portion 121. The above-mentioned adjustment of conditions such as horizontal/vertical position and density level adjustment are directed through the plurality of keys 120. For example, when the density adjustment is directed by selecting any one from the plurality of keys 120, the density level adjustment is conducted by using cursor keys 116–119 different from the keys 120. The remote control signals to be transmitted by directing the keys are radio-transmitted from a transmitter 121. The main body 100 comprises a receiver corresponding the transmitter 121, which receives a remote control signal transmitted from the transmitter 121 of the remote controller 105, and adjusts the above-mentioned display conditions on the basis of the received remote signal.

In the following, the operation of the liquid crystal projection apparatus will be described. FIG. 31 is a block diagram showing an electrical configuration of the conventional liquid crystal projection apparatus. The main body 100 of the conventional liquid crystal projection apparatus comprises an input circuit 200, an A/D (analog/digital) conversion circuit 201, a signal converter 202, a MPU (Micro Processing Unit) interface data register 203, a MPU 204, a PLL (Phase-Locked Loop) 205, a memory controller 206, a field memory 207, a LCD (Liquid Crystal Display) controller 208, a LCD unit 209, and a receiver 210. The main body 100 is interconnected to the personal computer 103 via cable 104, an RGB type of cable, that connects to a RGB connector 104b on the main body 100 and a CRT type of connector 104a of the personal computer 103.

The signals inputted from the personal computer 103 through the cable 104 are separated into respective image signals of red (R), green (G), and blue (B) and horizontal (H) and vertical (V) synchronizing signals in the inputted circuit 200. The horizontal/vertical synchronizing signals are supplied to the signal converter 202, and the image signals of R, G, and B are supplied to the signal converter 202 after being converted into digital signals in the A/D conversion circuit 201. The horizontal/vertical synchronizing signals supplied to the signal converter 202 are controlled in timing by the MPU interface data register 203 and then supplied to the MPU 204. The MPU 204 distinguishes the type of the personal computer 103 connected to the main body 100 on the basis of the inputted synchronizing signals. Additionally, the MPU 204 supplies signals for timing adjustment, suitable to the personal computer 103 connected thereto, through the MPU interface data register 203 to the signal converter 202. The PLL 205 is provided for stabilizing the signals for timing adjustment.

The image signals of R, G, and B inputted into the signal converter 202 is inputted into the memory controller 206 and supplied to the field memory 207 on the basis of the signals for timing adjustment inputted to the memory controller 206. The image signals of R, G and B inputted into the field memory 207 are read out on the basis of read out signals prepared in the memory controller 206; inputted into the LCD controller 208; converted to control signals corresponding to the LCD unit 209; and supplied to the LCD unit 209.

Additionally, the remote control signals transmitted from the remote controller 105 are received by the receiver 210 of the main body 100 and supplied to the MPU 204. The MPU 204 converts the remote control signals and thereafter supplies the converted signals to the LCD unit 209 through the MPU interface data register 203, the signal converter 202, the memory controller 206, the field memory 207 and the LCD controller 208.

As described above, when the presenter him (her) self operates the mouse 110 of the personal computer 103, he (she) must conduct key operation while watching display means of the personal computer 103 arranged separately from the screen 102, as well as presentation while watching the screen 102. That is a burden for the presenter.

On the other hand, when the operation is specially carried out by another person, it is difficult to obtain the coincidence of the timing of changing the projection images and the timing of the operator's key operation. That leads to a problem that the presentation does not flow smoothly.

Moreover, there is also a case such that the personal computer 103 is controlled through the main body 100 of the liquid crystal projection apparatus. In this case, although command signals for controlling the personal computer 103 are outputted to the personal computer 103 from the main body 100 on the basis of the key operation of the remote controller 105, it is necessary to prepare a plurality of software programs for creating command signals, because the command signals are different among the types of personal computer. That requires a lot of time and is inconvenient.

SUMMARY OF THE INVENTION

An object of the invention is to provide a liquid crystal projection apparatus which is excellent in operation and is capable of realizing smooth presentation.

The invention provides a liquid crystal projection apparatus comprising:
  a main body which is connected to an image signal source which generates an image signal on the basis of a predetermined signal, displays an image based on the image signal from the image signal source, and is disposed between a light source and a projection lens of a magnifying projection apparatus for projecting the light from the light source through the projection lens, and
  a remote controller for controlling the display condition of an image displayed on the main body, wherein
  the remote controller possesses operation means for controlling the image signal source and signal outputting means for transmitting an operational signal in response to an output from the operation means, and
  the main body possesses control means which receives the operational signal from the remote controller, converts the operational signal to a control signal corresponding to the connected image signal source and sends the control signal to the image signal source.

Further, the control means of the invention is characterized by possessing signal conversion means for converting the operational signal to the control signal corresponding to the connected image signal source and regulation means for regulating the output level and output timing of the control signal.

Further, the operation means of the invention is characterized by possessing a plurality of operation buttons whose output signal levels depend on electrical conductivity or non-conductivity between two electrodes.

Still further, the operation means of the invention is characterized by possessing detection means for converting a mechanically applied pressure to an electrical signal and outputting the electrical signal.

Yet further, the image signal source of the invention is characterized in that the image signal source is a personal computer which generates the image signal on the basis of a mouse signal from connected direction means, and that the control means of the main body converts the operational signal from the remote controller to the mouse signal and sends the mouse signal to the personal computer.

According to the invention, the main body of the liquid crystal projection apparatus is disposed between the light source of the magnifying projection apparatus and the projection lens in the engaged state thereof, and the image displayed on the main body is magnified and projected by projecting the light emitted from the light source onto a screen through the projection lens. The main body is connected to the image signal source in order to display an image on the main body. The main body displays the image based on an image signal which is generated on the basis of a predetermined control signal by the image signal source. The image displayed on the main body is adjusted in display conditions such as density with the remote control means of the liquid crystal projection apparatus.

In such a liquid crystal projection apparatus, the remote control means comprises operation means for controlling the image signal source and signal outputting means for sending an operation signal in response to an output from the operation means, and the main body comprises control means which receives the operational signal from the remote control means, converts the operational signal to a control signal corresponding to the connected image signal source and sends the control signal to the image signal source.

Consequently, an operator using the liquid crystal projection apparatus in the vicinity of the magnifying projection apparatus where the main body is arranged can control the image signal source by the use of the remote control means and therefore control an image displayed on the main body connected to the image signal source. As a consequence, operations such as changing an image can be smoothly conducted without an operator for operating the image signal source.

Preferably the control means comprises signal conversion means for converting the operational signal to a control signal corresponding to the connected image signal source and regulation means for regulating the output level and output timing of the control signal and the control means can output a signal created with the signal conversion means with a timing based on the control of the adjusting means.

The operation means of the remote control means preferably possesses a plurality of operation buttons whose output signal levels depend on electrical continuity/discontinuity between two electrodes, and a plurality of operations can be specified on the basis of an output signal from the buttons.

Further preferably, the operation means of the remote control means possesses detection means for converting a mechanically applied pressure to an electrical signal and outputting the electrical signal, a plurality of operations can be selected on the basis of detection results as the detection means.

Further preferably, the image signal source is realized by a personal computer, and the personal computer generates an image signal on the basis of a mouse signal from the connected mouse as direction means. The operational signal from the remote control means to the mouse signal and sends the mouse signal to the personal computer. Thus the liquid crystal projection apparatus with an improved operation characteristic can be realized.

In such a liquid crystal projection apparatus, since an operational signal transmitted from the remote control means is sent to the image signal source after being converted to a control signal corresponding to the image signal source connected to the main body, the control signal corresponding to the image signal source can be supplied to the image signal source regardless of the types of image signal source.

BRIEF DESCRIPTION OF THE DRAWINGS

Other and further objects, features, and advantages of the invention will be more explicit from the following detailed description taken with reference to the drawings wherein:

FIG. 9 is a diagram showing a constitution of the data stored in a ROM 63 of the data matrix 51;

FIGS. 10A–10F are timing charts of signals outputted from the ROM 63;

FIGS. 14A, 14B are diagrams showing examples of normal and reverse signals;

FIGS. 15A, 15B are diagrams showing the format of mouse signal;

FIG. 28A is a view of the pin connection arrangement of a connector 106 connecting the mouse 110 and the personal computer 103;

FIG. 28B is a diagram of a relationship between pins and output signals of the connector 106;

FIGS. 29A, 29B are perspective views of other type of mouse 111;

DETAILED DESCRIPTION OF THE PREFERRED EMBODIMENTS

Figure 1:
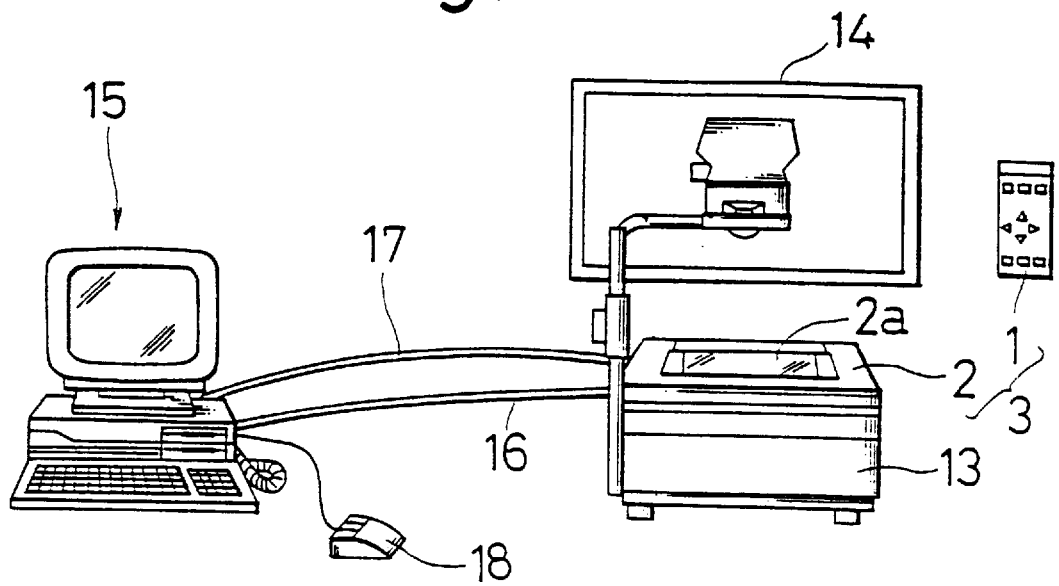
FIG. 1 is a view for explaining an engaged state of a liquid crystal projection apparatus 3 of an embodiment of the invention.

Now referring to the drawings, preferred embodiments of the invention are described below.

FIG. 1 is a view for explaining an engaged state of a liquid crystal projection apparatus 3 of an embodiment of the invention.

The liquid crystal projection apparatus 3 comprises a main body 2 and a remote controller 1 and the main body 2 is put on the panel of an OHP 13 in use. The OHP 13 is provided with a light source and a projection lens below and above the panel, respectively, on which the main body 2 is to be put, and projects the light emitted from the light source onto a screen 14 through the projection lens. The main body 2 is realized, for example, by a transmissive-type liquid crystal display panel; connected to a personal computer 15 through cables 16, 17, and displays an image based on the image signal from the personal computer 15. The image displayed on the main body 2 is magnified and projected on the screen 14 by the OHP 13.

A mouse 18 which is direction means for inputting a specified mouse signal as a control signal is connected to the personal computer 15. An operator moves a cursor displayed on display means of the personal computer 15 to a desired position by the use of the mouse 18, in order to specify a process. A mouse signal is inputted into the personal computer 15 by this operator's specification and the personal computer 15 outputs an image signal responding to the mouse signal into the main body 2 through the cable 17. The image signal is thus selected. More specifically, the personal computer 15 outputs the image signal on the basis of the process predetermined in the position specified by the mouse 18.

The remote controller 1 comprised by the liquid crystal projection apparatus 3 have a plurality of buttons and keys as described below, through which the adjustment of display conditions such as horizontal/vertical position and density is conducted. Additionally, the main body 2 have a display portion 2a composed of a liquid crystal display panel with a constitution as described below.

The embodiment is characterized in that the remote controller 1 has a mouse function, and a remote control signal outputted from the remote controller 1 is transmitted to the personal computer 15 through the remote cable 16 for a mouse signal or a key board signal after being converted into a mouse signal or key board signal corresponding to the personal computer in the main body 2. As a result, the image displayed on the screen 14 is controlled in accordance with a mouse signal or key board signal transmitted to the personal computer 15. In other words, the operator can control an image projected on the screen 14 by using the mouse function of the remote controller 1 at hand.

Figure 2:
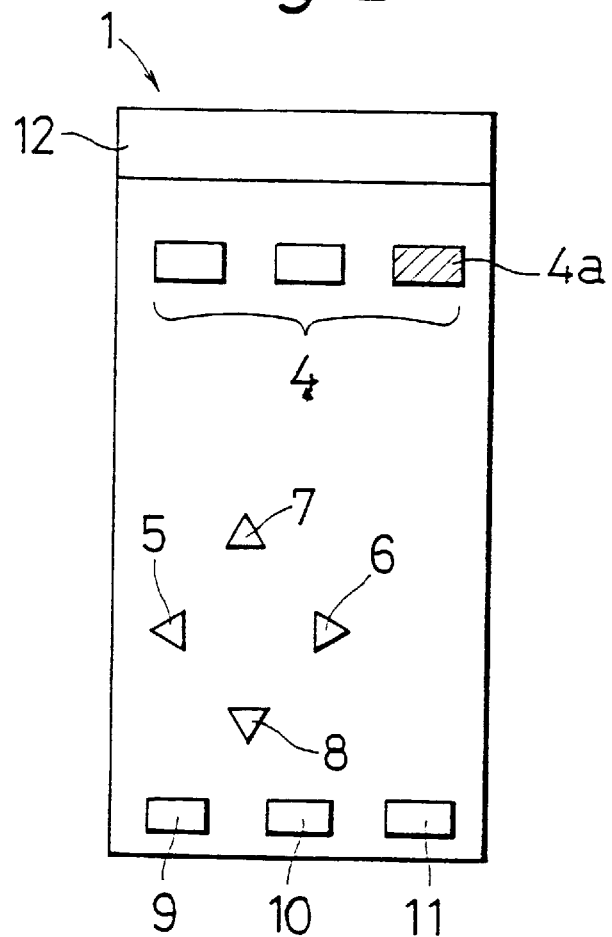
FIG. 2 is a plane view of a remote controller 1 of the liquid crystal projection apparatus 3.

FIG. 2 is a plane view of the remote controller 1. The remote controller 1 is provided with a mouse selection key 4a (indicated by oblique hatching in FIG. 2) for selecting a mouse function, which allows an operator to conduct the same key operation as the mouse 18. When the mouse function is not selected, a conventional operation can be conducted through the remote controller 1. For that purpose, the remote controller 1 is provided with a plurality of keys 4–8, a plurality of switches 9–11 and a transmitter 12.

The above-mentioned horizontal/vertical position adjustment and density adjustment are directed through the plurality of keys 4. For example, when contrast adjustment is conducted by selecting one key from among the plurality of keys 4, the contrast level is adjusted by cursor keys 5–8 different from the keys 4. Remote control signals transmitted by specifying the keys are radio-transmitted from the transmitter 12. The main body 2 is provided with a receiver corresponding to the transmitter 12, which receives the remote control signal transmitted from the transmitter 12 of the remote controller 1, and the adjustment of the display conditions mentioned above is conducted.

When the above-mentioned mouse selection key 4a is selected from among the plurality of keys 4, data code signals corresponding to the variation of the mouse ball of a conventional mouse are transmitted as remote control signals from the remote controller 1. The receiver of the main body 2 receives the data code signal from the remote controller 1.

Figure 3:
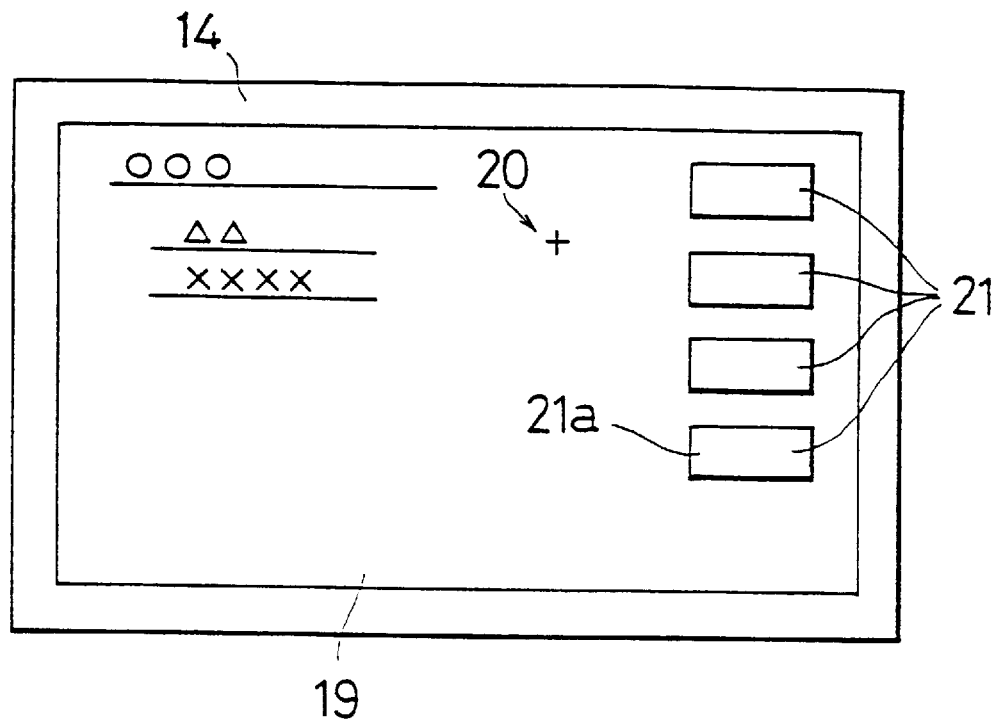
FIG. 3 is a view of an image 19 projected on the screen 14.

FIG. 3 is a view of an image 19 projected on the screen 14. The image 19 projected on the screen 14 is the same as the image displayed on display means which the personal computer 15 possesses, and a cursor 20 and a plurality of icons 21 are displayed in the image region of the screen 14. The icons 21 individually show a plurality of processes. The cursor 20 is positioned in a display region corresponding to a desired process in order to select the desired process and thereby the process set in response to the selected icon is executed. For example, when icon 21a is selected from among the plural icons 21, other information stored in the personal computer 15 is read out and projected on the screen 14. The movement of the cursor 20 and the selection among the icons 21 are conducted by the selection of a mouse key 4a of the remote controller 1 and the operation of cursor keys 5–8 and switches 9–11.

Figure 4:
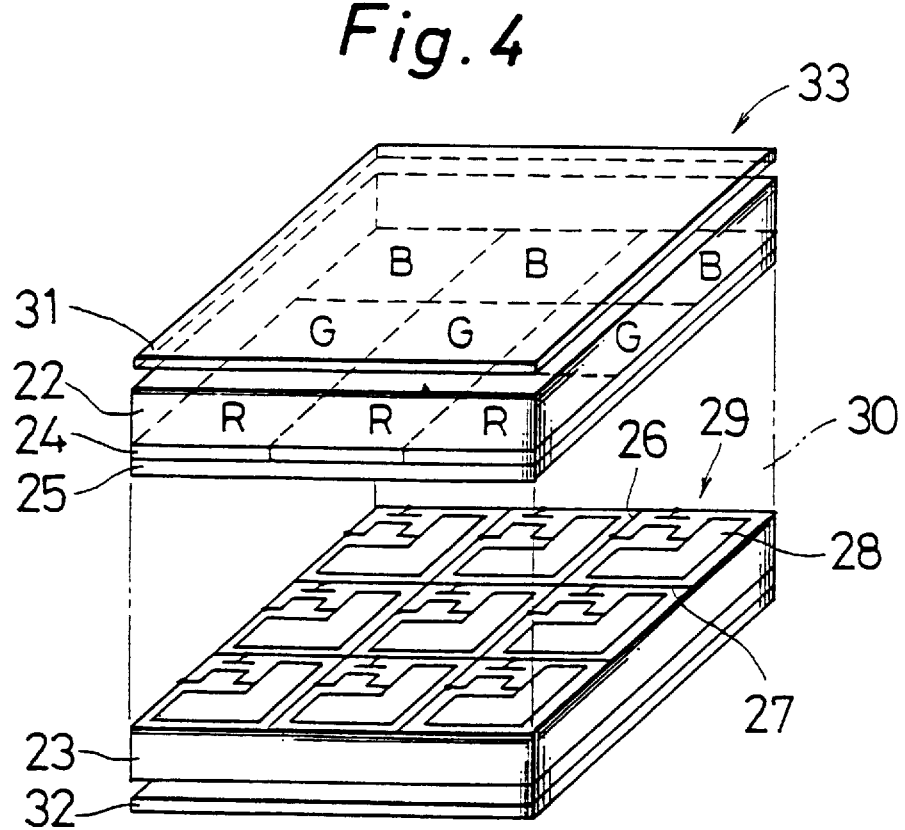
FIG. 4 is a perspective view of a transmissive type liquid crystal display panel 33 constituting a display portion 2a of a main body 2 of the liquid crystal projection apparatus 3.

FIG. 4 is a perspective view of a transmissive-type liquid crystal display panel 33 constituting a display portion 2a of a main body 2 of the liquid crystal projection apparatus 3. The transmissive-type liquid crystal display panel 33 is constituted by light transmitting substrates 22, 23, a liquid crystal layer 30 interposed therebetween, and polarizing plates 31, 32 disposed on the opposite side to the liquid crystal layer 30 of the light transmitting substrates 22, 23, respectively. On the surface of one light transmitting substrate 22 on the liquid crystal layer 30 side is disposed a color filter 24 composed of filters of three colors R, G, B and additionally a common electrode 25 is formed to envelope the color filter 24.

On the surface of the other light transmitting substrate 23 on the liquid crystal layer 30 ride, a plurality of source bus lines 26 are disposed in parallel with each other, and a plurality of gate bus lines 27 are disposed in a direction perpendicular to the source bus lines 26 so that the insulation between the source bus lines 26 and the gate bus lines 27 is maintained. A rectangular region formed by the source bus line 26 and the gate bus line 27 is considered as one picture element, and a picture element electrode 28 is disposed in the region. The picture element electrodes 28, the source bus lines 26, and the gate bus lines 27 are connected by TFT elements 29. Orientation treatment is applied to the surfaces of the substrates 22, 23 in order to control the orientation condition of the liquid crystal molecules adjacent to the liquid crystal layer 30.

Image signals from the personal computer 15 are sent to the source and gate bus lines 26, 27 and a voltage is selectively applied to the plurality of picture element electrodes 28. Consequently, displaying is realized by transmitting or interrupting the incident light on the basis of the selection of the plurality of picture elements.

Figure 5:
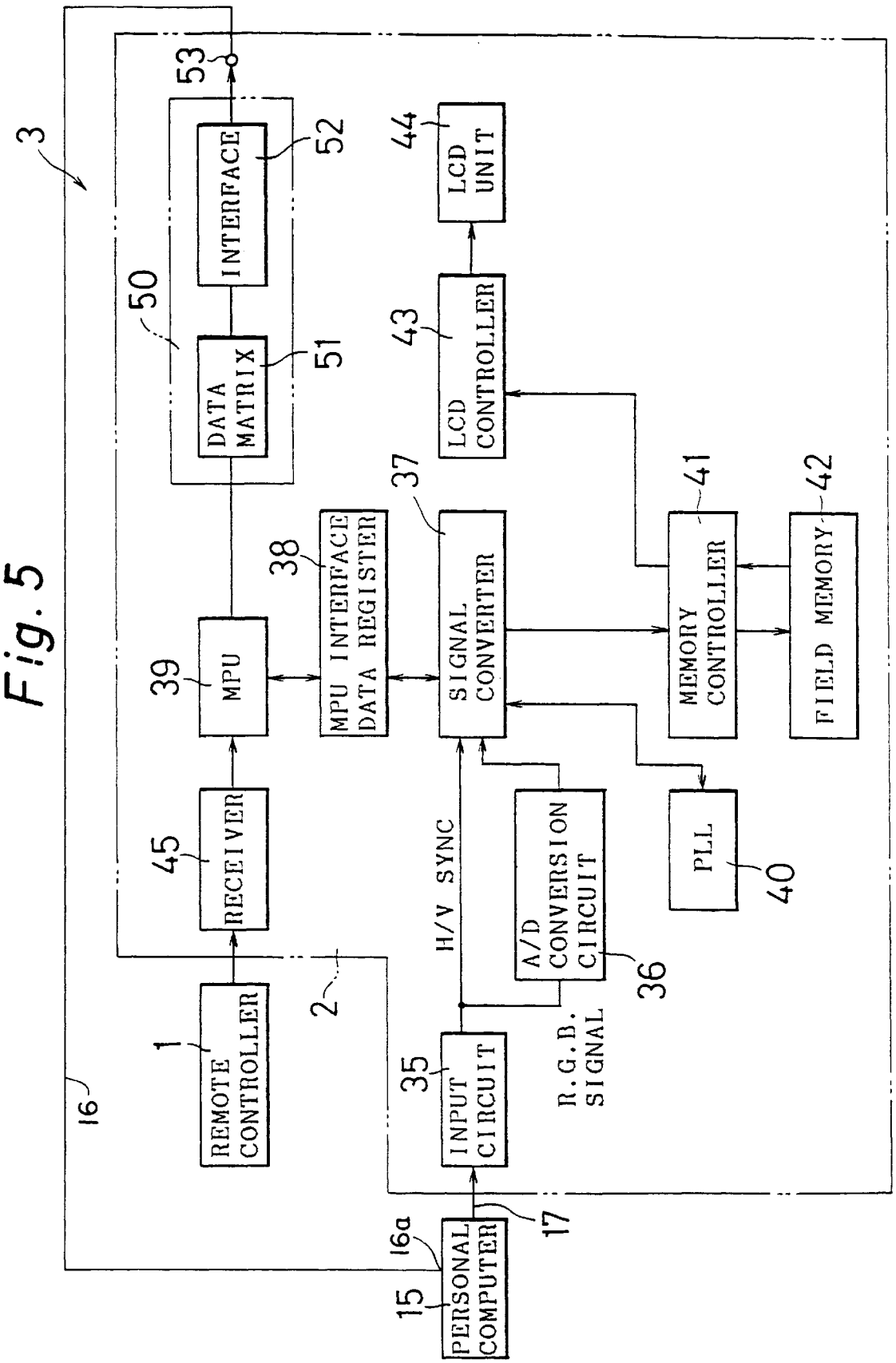
FIG. 5 is a block diagram showing an electrical configuration of the liquid crystal projection apparatus 3.

FIG. 5 is a block diagram showing an electrical configuration of the liquid crystal projection apparatus 3. The liquid crystal projection apparatus 3 comprises the remote controller 1 and the main body 2. The main body 2 comprises an input circuit 35, an A/D conversion circuit 36, a signal converter 37, a MPU interface data register 38, a MFU 39, a PLL 40, a memory controller 41, a field memory 42, a LCD controller 43, a LCD unit 44, a receiver 45 and a converter 50.

The signals inputted from the personal computer 15 through the cable 17 are separated into R (red), G (green), and B (blue) image signals, a horizontal (H) and a vertical (V) synchronizing signal in the input circuit 35. The horizontal/vertical synchronizing signals are sent to the signal converter 37, and the R, G, and B image signals are converted into digital signals in the A/D conversion circuit 36 to be sent to the signal converter 37. The horizontal/vertical synchronizing signals supplied to the signal converter 37 are controlled in timing by the MPU interface data register 38 and sent to the MPU 39. The MPU 39 distinguishes the type of the personal computer 15 connected to the main body 2 on the basis of the inputted synchronizing signals. In addition to that, the MPU 39 supplies signals for adjusting the timing corresponding to the connected personal computer 15 to the signal converter 37 through the MPU interface data register 38. The PLL 40 is directed to stabilizing the signals for adjusting the timing.

The R, G, and B image signals inputted into the signal converter 37 are inputted into the memory controller 41, and sent to the field memory 42 on the basis of the signals for timing adjustment. The R, G and B image signals inputted into the field memory 42 are read out on the basis of the read out signals prepared in the memory controller 41; inputted into the LCD controller 43; converted into control signals corresponding to the LCD unit 44; and supplied to the LCD unit 44.

The remote control signals transmitted from the remote controller 1 in a conventional manner are received by the receiver 45 of the main body 2 and sent to the MPU 39. The MPU 39 converts the remote control signals and supplies them through the MPU interface data register 38, signal converter 37, memory controller 41, field memory 42 and LCD controller 43 to the LCD unit 44.

Additionally, as described above, the cursor keys 5–8 and switches 9–11 are pushed down by selecting the mouse selection key 4a of the remote controller 1 and also the transmitted data code signals are received by the receiver 45 and sent to the MPU 39. A transmission code is predetermined for each of the cursor keys 5–8 and switches 9–11, and from which key or switch the direction is issued can be identified by the discrimination of the transmission codes with the MPU 39.

The data code signals inputted into the MPU 39 are further sent to the converter 50 in order to be converted into mouse signals or key board signals corresponding to the connected personal computer 15. In the following, only the case of conversion into the mouse signals corresponding to the personal computer will be described. It is needless to say that the description is applicable also to the case of conversion into the key board signals. The converted mouse signals are outputted from a terminal 53 for outputting a signal and sent to the personal computer 15 through the cable 16.

The conversion method for converting the signals corresponding to the connected personal computer 15 includes a manual method and the method described in the above-mentioned prior art such that the signals are converted after automatically discriminating the type of the connected personal computer on the basis of the signals transmitted to the main body 2 through the cable 17 for display signals from the personal computer 15. The discrimination of the connected personal computer 15 is completed before the system operation in the manual method, or it is completed at the initial stage of the system operation in the automatic method.

The converter 50 comprises a data matrix 51 and an interface 52. Mouse signals are different among various types of personal computers in input/output level. The data code signals from the remote controller 1 are converted to mouse signals suitable to an interface of the connected personal computer in the data matrix 51 in the converter 50.

At this point, data of various personal computers are stored in a memory and the like (including an external storing device such as an IC card). The converted mouse signal is further processed to an actual signal level in the interface 52 and outputted from a terminal 53 for outputting a mouse signal with a predetermined timing. The mouse signal outputting terminal 53 is connected to a mouse terminal 16a or key board terminal of the personal computer 15 with the cable 16 for mouse signals, with which the mouse signal is transmitted to the personal computer 15. Additionally, radio-connection may be employed by using interrogator-responder (IR) communication or the like instead of the cable 16 for mouse signals.

Figure 6:
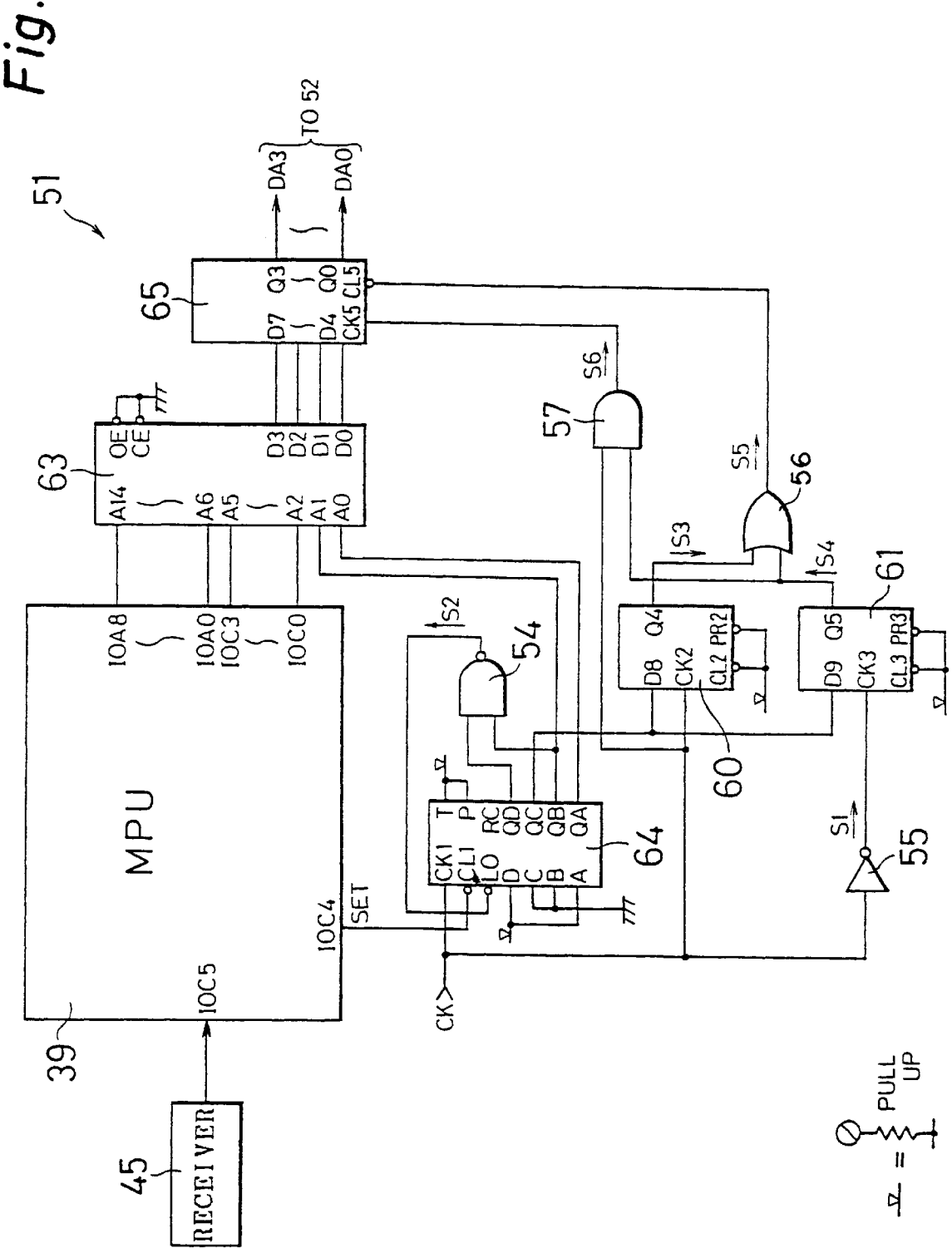
FIG. 6 is a block diagram showing an electrical configuration of a data matrix 51.
Figure 7:
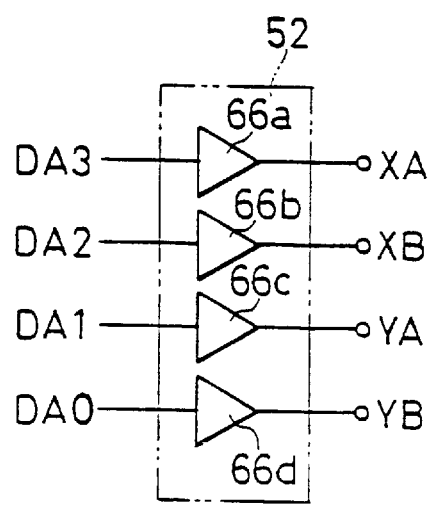
FIG. 7 is a block diagram showing an electrical configuration of an interface 52.

FIG. 6 is a block diagram showing an electrical configuration of the data matrix 51, and FIG. 7 is a block diagram showing an electrical configuration of the interface 52. The data matrix 51 comprises a ROM 63 in which mouse signal data corresponding to various personal computers is pre-stored, ICs (integrated Circuits) 60, 61, 64, 65 and logic circuits 54–57 which conduct timing adjustment. The MPU 39 comprises address ports IOA0–IOA8 corresponding to the type of personal computer, data code ports IOC0–IOC3 corresponding with a data code signal from the remote controller 1, an output port IOC4 for outputting a system operation start signal SET, and a port IOC5 into which a remote control signal to be transmitted to the receiver 45 is inputted. The ports IOA0–IOA8 are connected to ports A6–A14 of the ROM 63, and the ports IOC0–IOC3 and the port IOC 4 are connected to ports A2–A5 of the ROM 63 and a port CL1 of the IC 64, respectively.

When a data code signal is inputted as a remote control signal into the port IOC5 of the MPU 39, the MPU 39 outputs the inputted data code signal through the ports IOC0–IOC3. The type of the personal computer 15 is identified on the basis of the horizontal(H) and vertical(V) synchronizing signals inputted from the personal computer 15, and then from the ports IOA0–IOA8 are outputted signals for selecting mouse signal data corresponding to the personal computer 15 from among the mouse signal data corresponding to the various types of personal computer stored in the ROM 63.

The mouse signal data corresponding to the various types of personal computer is pre-stored in the ROM 63, and the mouse signal selected on the basis of the data code signals and signals for identifying the type of the personal computer is outputted from ports D0–D3 with the same timing as that of a signal inputted into ports A0, A1.

The output form the ROM 63 is sent to each of ports D4–D7, and then outputted from ports Q0–Q3 with a predetermined timing. The output signals DA0–DA3 are sent to the interface 52. The interface 52 comprises buffers 66a–66d, in which the output levels of signals DA0–DA3 are regulated, respectively, and outputted as signals YB, YA, XB, XA, respectively. The signals XA, XB, YA, YB are inputted into the personal computer 15 through the cable 16.

Figure 8:
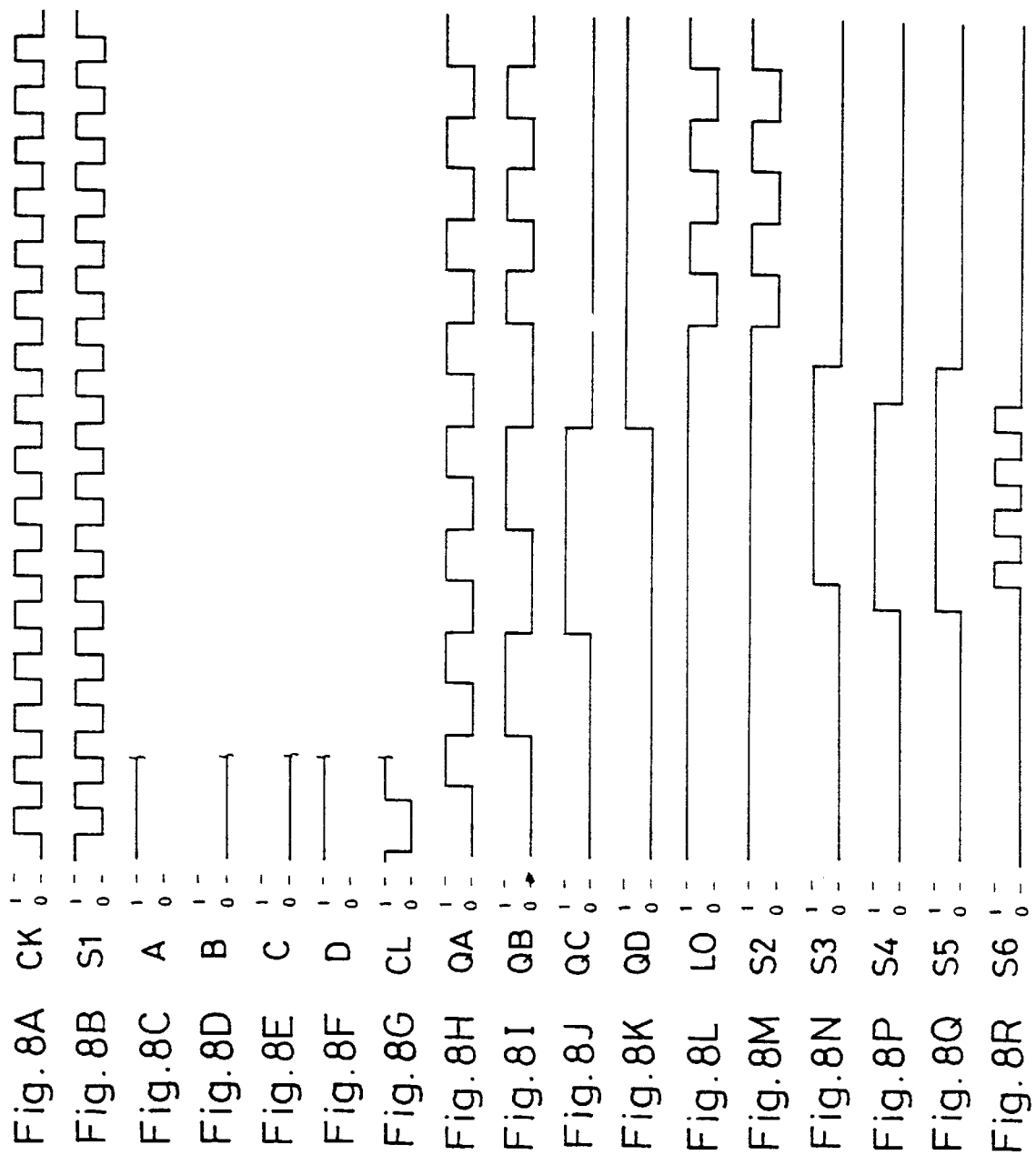
FIGS. 8A–8N, 8P–8R are timing charts showing signals in the data matrix 51.

FIGS. 8A–8N, 8P–8R are timing charts showing signals in the data matrix 51. The signal SET from the port IOC4 of the MPU 39 is sent each time of inputting into the port IOC5, and the signal SET is inputted as a clear signal into the port CL1 of the IC 64. Consequently the signal inputted into the ports CL1 is as shown in FIG. 8G. The ports B,C out of the ports A–D of the IC 64 are grounded, and the electric potential of the ports A,D are preset to be a predetermined value. Consequently the signals inputted into the ports A–D are as shown in FIGS. 8C–8F. The output from a port QA as shown in FIG. 8H and the output from a port QB as shown in FIG. 8I are sent to a port A0 and a port A1 of the ROM 63, respectively. The outputs from pouts QB, QD as shown in FIGS. 8I, 8K are processed in the NAND circuit 54 and the obtained signal S2 as shown in FIG. 8M is sent to the port L0 of the IC 64. Consequently the signal inputted into the port A–D is as shown in FIG. 8L. The output from a port QC as shown in FIG. 8J is sent to each of ports D8, D9 of the ICs 60, 61. A clock signal CK from an external circuit as shown in FIG. 8A is sent to ports CK1–CK3 of the ICs 64, 60, 61, respectively, and to the AND circuit 57. The pulse width of each pulse signal is determined by the clock signal CK. The IC 64 acts as a quarternary counter. Additionally, the clock signal CK to be sent to the IC 61 is sent thereto as a signal S1 as shown in FIG. 8B through the inverter 55.

The time variation of the signals outputted from the ROM 63 is controlled by a digit signal inputted into the ports A0, A1 of the ROM 63. The electric potentials of the ports CL2, PR2 of the IC 60 and the ports CL3, PR3 of the IC 61 are preset to be predetermined ones. Additionally, the output signals S3, S4 from the ports Q4, Q5 of the ICs 60, 61 as shown in FIG. 8N, 8P are sent to an OR circuit 56. The output signal S4 from a port Q5 of the IC 61 as shown in FIG. 8P is sent to the AND circuit 57. The output signal S6 from the AND circuit 57 as shown in FIG. 8R is sent to a port CK5 of the IC 65. The output signal S5 from the OR circuit 56 as shown in FIG. 8Q is inputted into a port CL5 of the IC 65.

In the following a signal conversion method will be concretely described. As an example, such case that the cursor 20 projected on the screen 14 is moved from position (0,0) to position (3,2) by the operation of the remote controller 1 will be described. The cursor keys 6, 7 are pushed down by selecting the mouse selection key 4a of the remote controller 1. The remote control signal transmitted from the remote controller 1 at that time is as shown in Table 1. When a remote controller as shown in the embodiment is employed, there are four types of transmitted signal. More specifically, they are (1,0), (−1, 0), (0,1), and (0,−1). These signals are transmitted times corresponding to the movement length.

TABLE 1

| Times of data transmission | 1 | 2 | 3 | 4 | 5 |
|---|---|---|---|---|---|
| X | 1 | 1 | 1 | 0 | 0 |
| Y | 0 | 0 | 0 | 1 | 1 |

The remote control signal is inputted into a port IOC5 of the MPU 39, and then sent through the ports IOC0–IOC3 to the ROM 63. In the embodiment the signal is sent through the ports IOC0, IOC1 to the ports A2, A3 of the ROM 63.

FIG. 9 is a view showing an electrical configuration of the mouse signal data 91 stored in the ROM 63. For example, when mouse signals corresponding to four types of personal computer are stored, four mouse signals are stored in correspondence to each of the remote control signals, namely he number of data amounts to 16 in total.

Since signal (1,0) is transmitted in the first transmission of remote control signal, mouse signal data "00"–"03" is selected in the ROM 63. Further, based on the signals from the MPU 39 which identify the type of the connected personal computer, a mouse signal corresponding to the personal computer 15 is selected from among the mouse signal data "00"–"03".

FIGS. 10A–10F are timing charts of signals outputted from the ROM 63 in the first transmission of remote control signal. The mouse signal selected in the above-mentioned manner is sent to the IC 65 on the basis of unit signal of four signals transmitted in each of periods H1–H4 divided with the timing of the rising and falling of the signals inputted into the ports A0, A1. The signal (1,0) transmitted in the first transmission is as shown in FIG. 10. More specifically, the signals "0", "1" shown in Table 2 are inputted and transmitted each of the periods H1–H4. The remote control signals in the second and third transmissions are sent in the same manner. In the fourth and fifth transmissions, the signal (0,1) is transmitted.

TABLE 2

| A0 | 0 | 1 | 0 | 1 |
|---|---|---|---|---|
| A1 | 0 | 0 | 1 | 1 |
| D3 | 1 | 1 | 0 | 0 |
| D2 | 0 | 1 | 1 | 0 |
| D1 | 0 | 0 | 0 | 0 |
| D0 | 0 | 0 | 0 | 0 |

The mouse signals are composed as follows. In an optical mouse the rotation of a mouse ball is generally divided into a X- and a Y-direction intersecting at right angles with each other and transmitted to a disk encoder arranged in each direction. A plurality of slits are formed in the encoder along the circumference thereof. The width and interval of the slit are selected to be equal to each other. Additionally two projection means and two light receiving means are arranged in front of and behind the encoder. The light from one of the two projection means is received by one of the two light receiving means, and the light from the other of the two projection means is received by the other of the two light receiving means. The light received by the light receiving means is transmitted or intercepted, whereby the direction and length of movement are detected.

More specifically, the two sets composed of projection means and light receiving means are disposed staggered with each other by half of the slit width. As a consequence there exsists time lag of a quarter cycle between the signals detected in one of the two sets and the other of the two sets. The direction and length of movement are respectively detected by a time lag of two detected signals and the number of pulses.

For example, the signals shown in FIGS. 10C, 10D indicate signals in the X-direction and the signals shown in FIGS. 10E, 10F indicate signals in the Y-direction. The signal shown in FIG. 10C indicates a signal detected by one of the two light receiving means arranged in the X-direction, and the signal shown in FIG. 10D indicates a signal detected by the other of the two light receiving means. FIGS. 10E, 10F indicate the relevant signals in the case of the Y-direction. As shown in FIGS. 10C, 10D, the signal from the part D2 has a time lag of a quarter cycle to that from the port D3. That means the movement toward the X(+)-direction. On the other hand, the case of an advance of a quarter cycle means the movement toward the X(−)-direction. Additionally, one cycle means the movement of one pitch of the slit. FIGS. 10E, 10F mean no movement toward the Y-direction.

Figure 11:
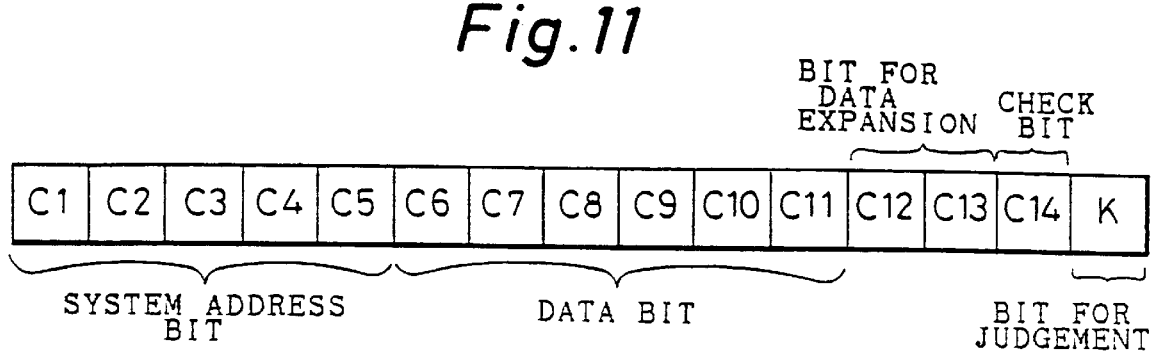
FIG. 11 is a diagram showing the format of a remote signal transmitted to the main body 2 from the remote controller 1.

FIG. 11 is a diagram showing the format of a remote signal transmitted to the main body 2 from the remote controller 1. For example, pulse position modulation (PPM) method is employed as a signal transmission method and data signals of 15 bits are used. Bits C1–C5 are used for system address, bits C6–C11 for data, bits C12, C13 for data expansion, a bit C14 for checking, and a bit K for judgment.

Figure 12A:
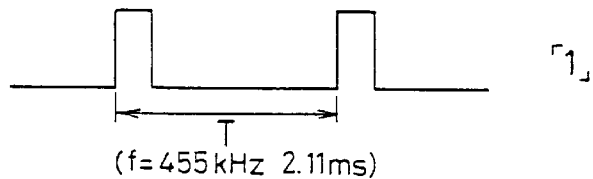
FIG. 12A is a diagram showing a signal of logic "1" with an interval T between the remote control signals.
Figure 12B:
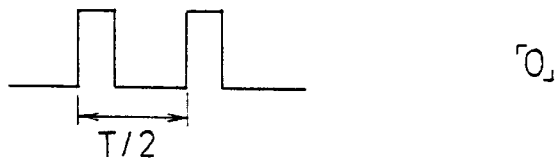
FIG. 12B is a diagram showing a signal of logic "0" with a signal interval T/2 between the remote control signals.

Additionally, the case where the data of 15 bits is transmitted as it is by the use of the data judgment bits (normal signal) and the case where the data is reversed-transmitted (reverse signal, excepting that system address bits are not reversed) are alternately repeated. On the receiver side, the data judgment bit is verified, and if it is a normal signal, it is stored as it is, or if it is a reverse signal, it is returned to the original signal thereof, it is verified that the returned original signal is the same as the normal signal and then finally it is considered that the transmitted data has been received. The PPM transmission method is a method wherein discrimination between logic "1" and logic "0" is executed by the constitution of pulse positions as shown in FIGS. 12A, 12B. FIG. 12A is a diagram showing a signal of logic "1" with a signal interval of T and FIG. 12B is a diagram showing a signal of logic "0" with a signal interval of T/2.

The system address bits C1–C5 are used for setting an address corresponding to a plurality of systems such as a television set, a video tape player, high vision television set and so on. The data bits C6–C11 are issued for setting execution contents corresponding to the input from the keys and switches of the remote controller 1. The data expansion bits C12, C13 are used for expanding the instructions set by the switches of the remote controller 1. In the embodiment, the bits C12, C13 are used when an instruction from the mouse selection key 4a is issued. The data judgment bit K is used as a bit indicating a data transmitting form. When the data judgment bit K is "0", a normal signal is transmitted, and when the data judgment bit K is "1", the signals to which the bits C6–C14, K are reversed are transmitted.

Figure 13:
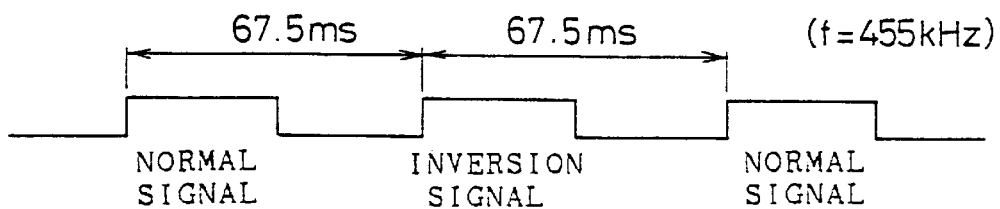
FIG. 13 is a diagram showing a remote control signal to be transmitted.

FIG. 13 is a diagram showing a remote control signal to be transmitted. As shown in FIG. 13, the normal and reverse signals are consecutive in serial, and are alternately repeated at predetermined intervals. On the receiving side, whether the signal is normal or reverse is judged on the basis of the contents of the data judgment bit K. FIGS. 14A, 14B are diagrams showing examples of normal and reverse signals.

FIGS. 15A, 15B are diagrams showing the format of a mouse signal. For the mouse signal, as shown in FIG. 15A, is used a data signal of 11 bits. More specifically, in addition to a start bit START, a stop bit STOP, and a parity bit P, eight bits b0–b7 are used as data bits. The start bit and stop bit are always set to "0" and "1", respectively. The data bits b0–b7 are used for storing the data indicating whether the buttons be pushed down or not, moving directions etc.

The mouse signal shown in FIG. 15A is outputted after the timing thereof has been regulated by the clock signal shown in FIG. 15B. In other words, the mouse signal is outputted after it has been verified that both the mouse signal and the clock signal are of "H" level. The outputting is interrupted when either of them is of "L" level. Additionally, the clock signal is outputted so as to be of "H" level just before and just after outputting of the mouse signal.

Figure 16:
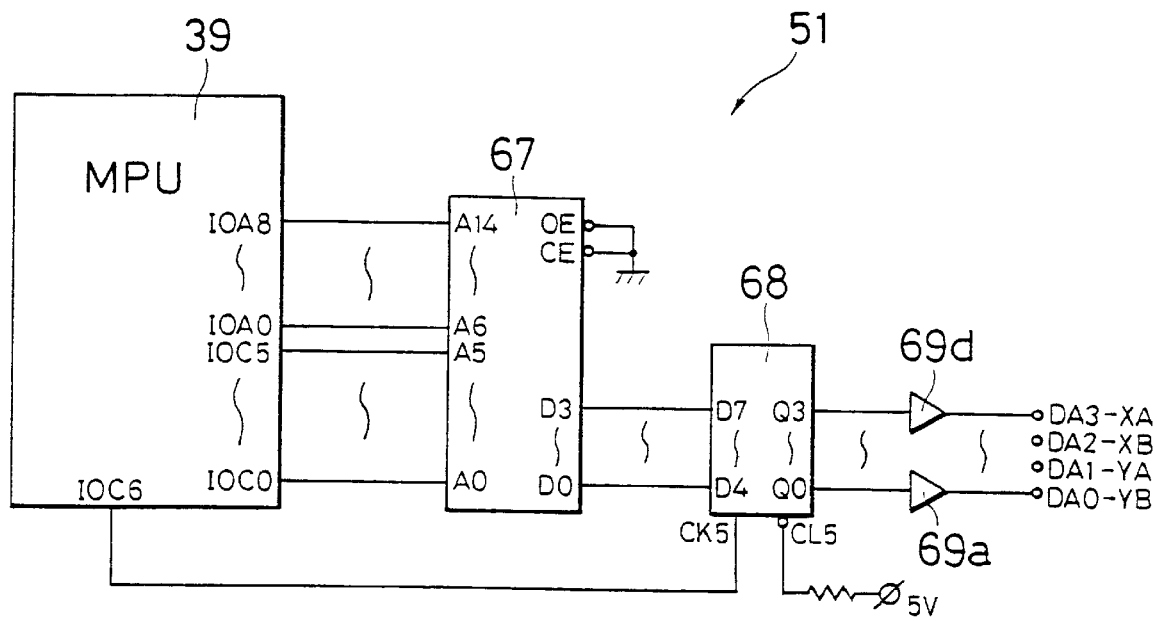
FIG. 16 is a block diagram showing an electrical configuration of a data matrix 51 of other embodiment of the invention.

FIG. 16 is a block diagram showing an electrical configuration of a data matrix 51 of other embodiment. Although the data matrix 51 is almost the same as the data matrix of the foregoing embodiment, the former data matrix is different from the latter data matrix in timing regulation, that is, timing regulation of the former is carried out in the MPU 39 itself, not in an IC outside the MPU 39. In the case, the circuits outside the MPU 39 are a ROM 67 and an IC 68, the circuit configuration is greatly simplified. The data matrix 51 is composed of the ROM 67 and the IC 68.

The address ports IOA0–IOA8 of the MPU 39 are connected to the ports A6–A14 of the ROM 67, the data code ports IOC0–IOC5 of the MPU 39 are connected to the ports A0–A5 of the ROM 67, and the output port IOC6 for outputting a clock signal CK is connected to a port CK5 of the IC 68. Since the timing regulation of the foregoing embodiment is carried out after being processed in the MPU 39, the signal whose timing has been controlled is fed to the ports A0–A5 of the ROM 67. The ROM 67 is almost the same as the ROM 63, and selects a signal corresponding to the personal computer 15, and sends the selected mouse signal to the IC 68 through the ports D0–D3. The IC 68 is almost the same as the IC 65, and feeds the inputted signal from the ports Q0–Q3 to the interface 52 through the buffers 69a–69d as signals DA0–DA3 at a predetermined timing. The voltage of the port CL5 of the IC68 is set to, for example, 5V.

Figure 17:
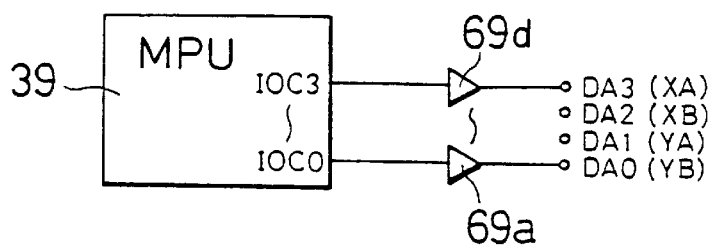
FIG. 17 is a block diagram showing an electrical configuration of a data matrix 51 of still other embodiment of the invention.

FIG. 17 is a block diagram showing an electrical configuration of a data matrix 51 of still other embodiment. The data matrix 51 is contained by the MPU 39 and the MPU 39 is characterized by having no external circuit. The above-mentioned signal processing is entirely carried out in the MPU 39, and therefore the circuit configuration is further simplified. The outputs from the ports IOC0–IOC3 of the MPU 39 are sent as signals DA0–DA3 to the interface 52 through the buffers 69a–69d, respectively.

As described above, the remote control signal from the remote controller 1 is converted to a mouse signal corresponding to the personal computer 15 connected through the main body 2 and then is inputted into the personal computer 15.

Additionally, the personal computer 15 outputs an image signal into the main body 2 through the cable 17 on the basis of the mouse signal inputted into the personal computer 15 and controls an image to be projected on the screen 14.

Generally speaking, an operational system and application software of a personal computer can be easily activated and controlled by the operation of a mouse which is a peripheral device of the personal computer. Since in the embodiment, as described above, a mouse signal converted in correspondence to the type of the personal computer is inputted, the personal computer 15 is easily controlled by the converted mouse signal. In the prior art, a command signal transmitted through a cable from the main body of a liquid crystal projection apparatus should be converted so as to be operated in accordance with the personal computer. So a software program for that purpose is required. On the other hand, in the embodiment the personal computer can be operated by inputting the mouse signal as it is without programming such a software.

Furthermore, in the above mentioned embodiment the cursor keys 5–8 are used as keys having the mouse function of the remote controller 1. Others are allowed to be used, if they have the function equivalent to that of the mouse. For example, a remote controller wherein a mouse ball installed on the top face thereof may be used instead of the cursor keys.

Figure 18:
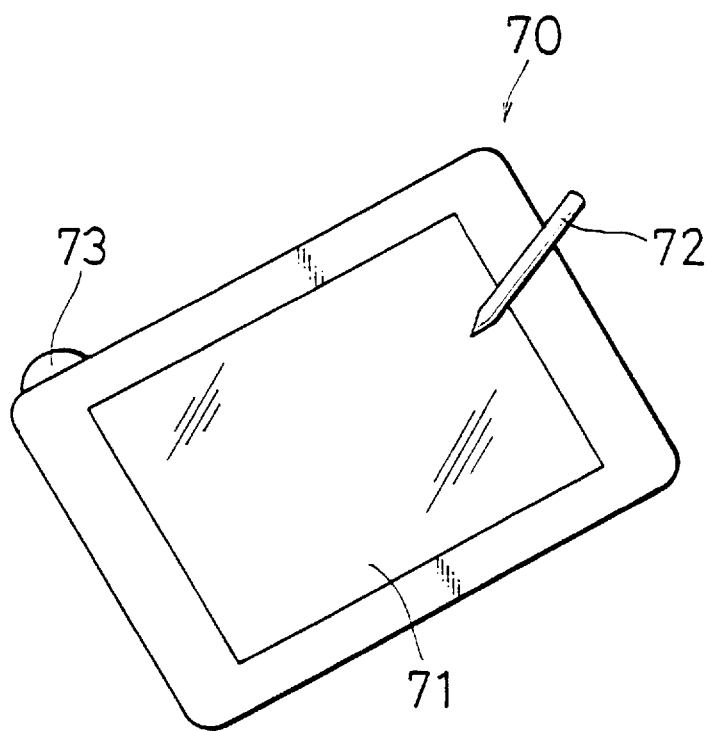
FIG. 18 is a plane view of an example of other remote controller 70.

FIG. 18 is a plane view of an example of other remote controller 70. The remote controller 70 is a combination of a liquid crystal display unit 71 and a light pen 72, and the controller which transmits the variation of the trace of a light pen 72 to the main body 2 may be used. For that purpose, a tablet or digitizer is arranged on the liquid crystal display unit 71. The remote controller 70 which is excellent in operational characteristics can be realized by making the screen of the liquid crystal display unit 71 the same as a projected image on the screen 14. Additionally, the remote controller 70 is provided with the same transmitter 73 as the transmitter 12 of the remote controller 1.

Figure 19:
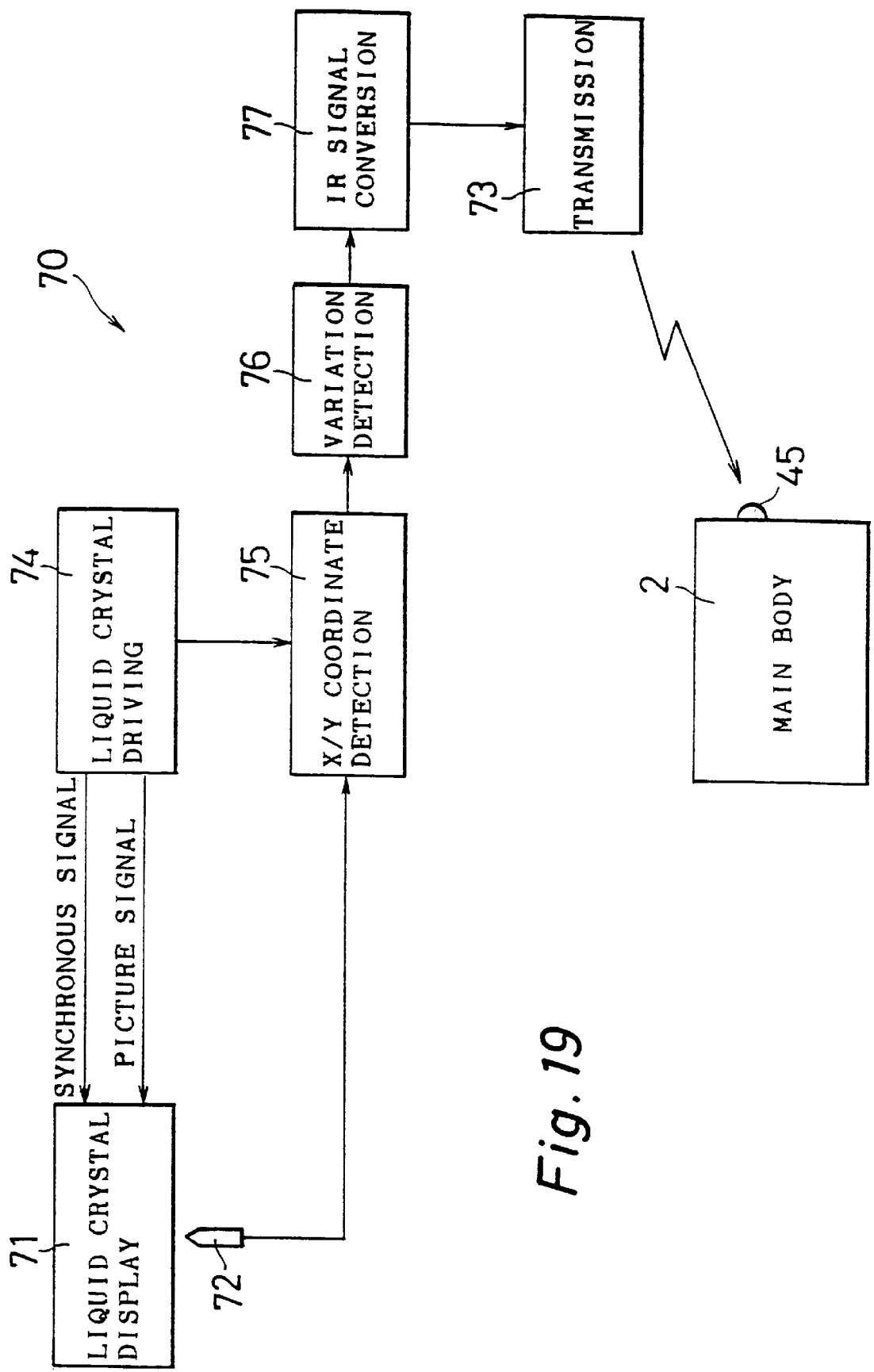
FIG. 19 is a block diagram showing an electrical configuration of the remote controller 70.

FIG. 19 is a block diagram showing an electrical configuration of the remote controller 70. The remote controller 70 comprises, in addition to the liquid crystal display unit 71, the light pen 72, and the transmitter 73, a liquid crystal driving circuit 74, a X/Y coordinate detection circuit 75, a variation detection circuit 76 and an IR signal conversion circuit 77. An image signal and a synchronizing signal are sent from the liquid crystal driving circuit 74 to the liquid crystal display unit 71. Thereby a predetermined image is displayed. The light pen 72 directs a desired icon among displayed image etc. The X/Y coordinate detection circuit 75 detects the directed position on the basis of an image signal and a direction signal with the light pen 72. The variation detection circuit 76 detects a variation on the basis of position data periodically read out with the X/Y coordinate detection circuit 75 at a predetermined timing. The IR signal conversion circuit 77 converts the variation detected in the variation detection circuit 76 to an IR signal to feed to the transmitter 73, which transmits the IR signal. The receiver 45 of the main body 2 receives the IR signal.

Figure 20:
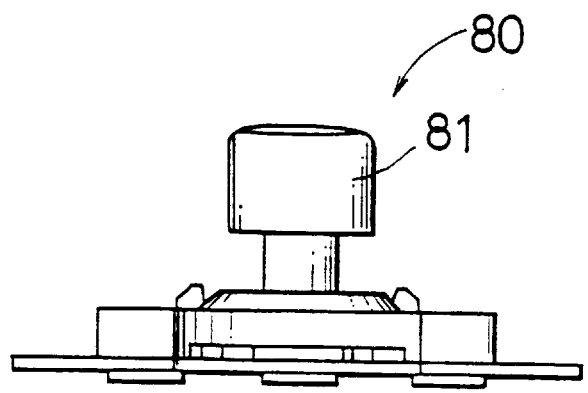
FIG. 20 is a side view of a joy stick 80 comprised by still other remote controller.
Figure 21:
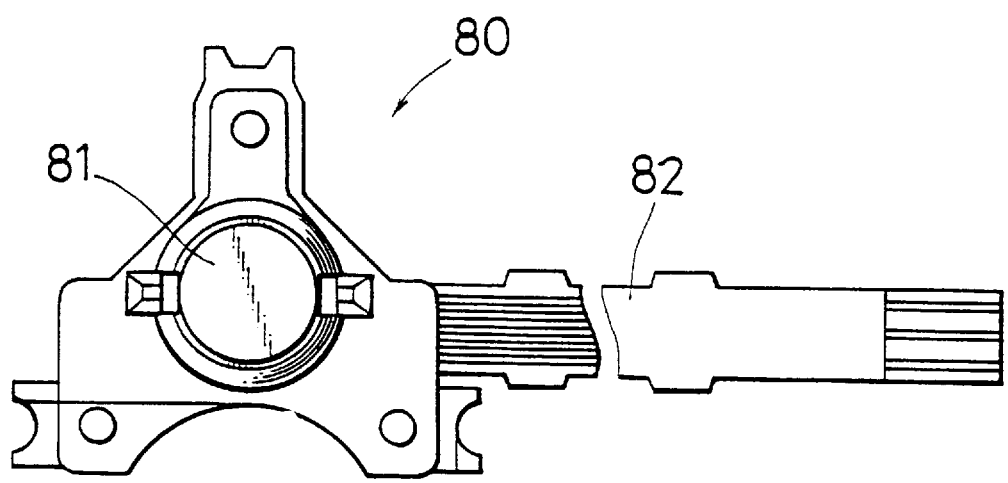
FIG. 21 is a plane view of the joy stick 80.

FIG. 20 is a side view of a joy stick 80 which other remote controller comprises. FIG. 21 is a plane view thereof. The joystick 80 comprises a stick portion 81 which can detect a pressure, and detects the pressure and direction applied by a finger of an operator etc. The detected pressure and direction are converted to electrical signals which are transmitted to the control portion through a cable 82.

Figure 22:
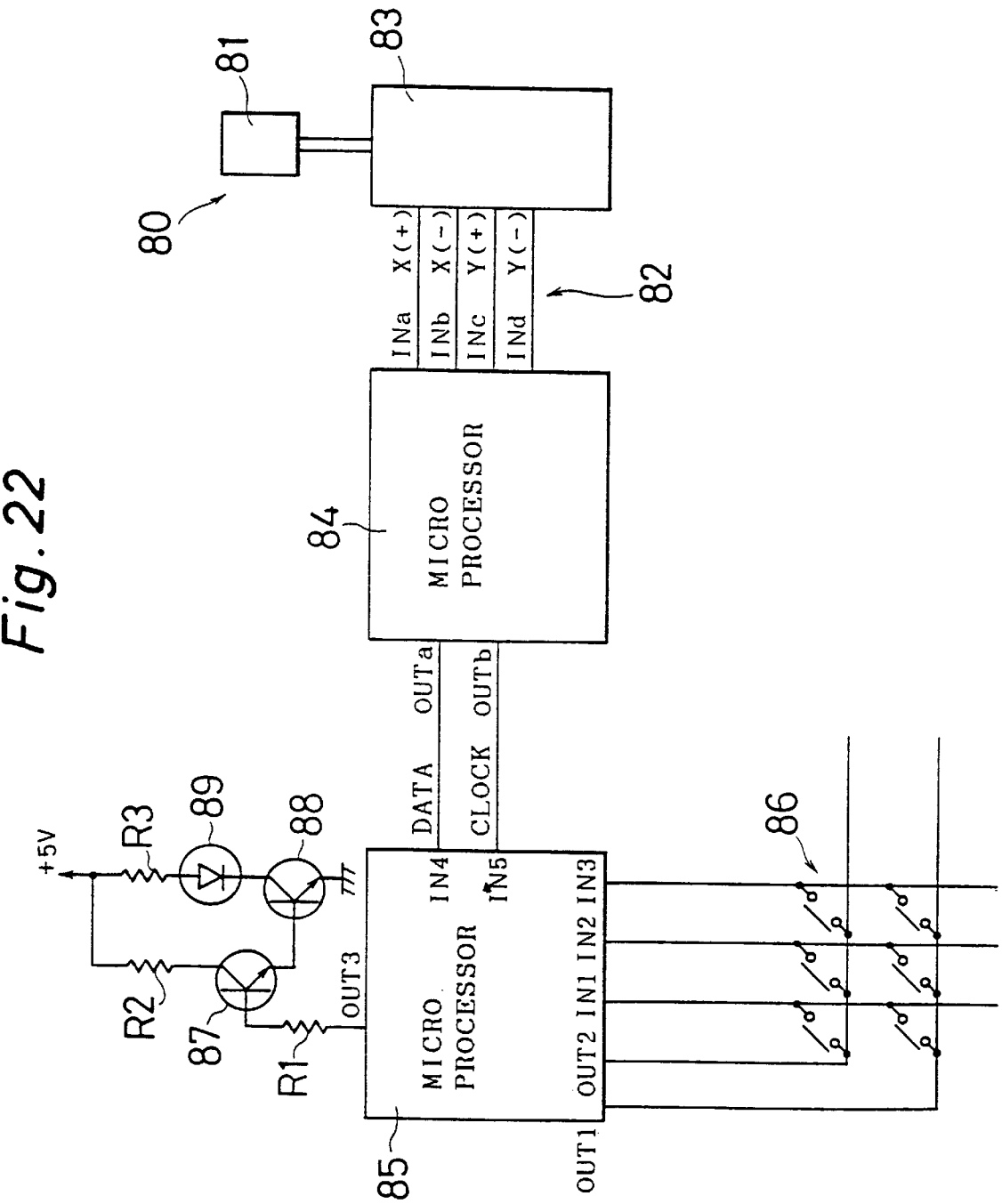
FIG. 22 is a block diagram showing an electrical configuration of the remote controller comprising the joy stick 80.

FIG. 22 is a block diagram showing an electrical configuration of a remote controller possessing the joy stick 80. The remote controller comprises the joy stick 80 possessing a stick portion 81 and a signal conversion circuit 83, micro processors 84, 85 as controllers, a plurality of switches and keys 86, transistors 87, 88, a diode 89, and resistors R1–R3. The pressure applied to the stick portion 81 is converted to an electrical signal in a direction corresponding to the direction of the voltage application in the signal conversion circuit 83, for example, in a X-direction (+), (−), or Y-direction (+), (−), to be inputted into the microprocessor 84 through the cable 82.

The microprocessor 84 detects the variations of the X and Y coordinates, converts the variations, for example, to mouse signals, and feeds to the microprocessor 85 as data signals and clock signals. The microprocessor 85 converts the signals inputted from the micro processor 84 or from the plurality of switches and keys 86 to IR signals.

The output from the microprocessor 85 is sent to the transistor 87 through the resistor R1. The output terminal of the transistor 87 is connected to the transistor 88. The output terminal of the transistor 88 is grounded and the input terminals of the transistors 87, 88 are set to +5V through the resistors R2, R3, respectively. A diode 89 is disposed between the resistor R3 and the transistor 88, and a predetermined signal is transmitted by a potential difference between the terminals of the diode 89.

Figure 23:
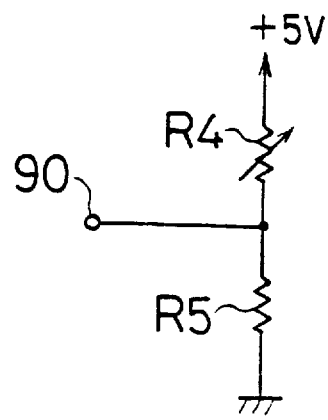
FIG. 23 is an output equivalent circuit diagram from a stick portion 81 of the joy stick 80.

FIG. 23 is an output equivalent circuit diagram from the stick portion 81 of the joy stick 80. The stick portion 81 comprises resistors R4, R5 and an output terminal 90. The output terminal 90 is connected between the resistors R4, R5 connected with each other in series. One resistor R4 of the two is set to +5V and the other R5 is grounded. The resistor R4 has a characteristic such that the resistance value varies with pressure.

Figure 24:
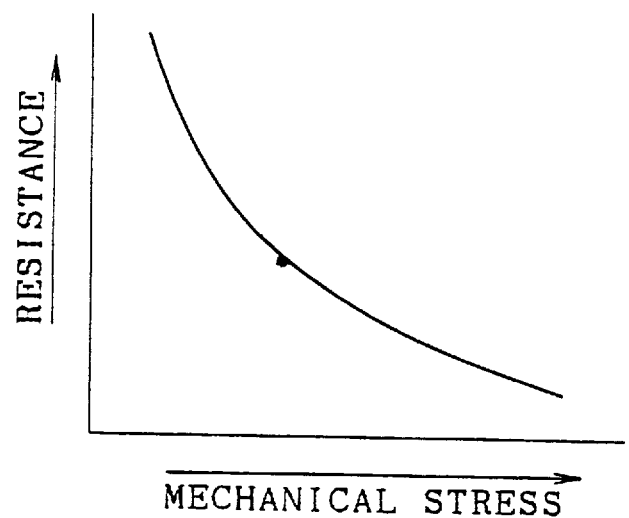
FIG. 24 is a graph showing a stress-resistance characteristic of the joy stick 80.
Figure 25:
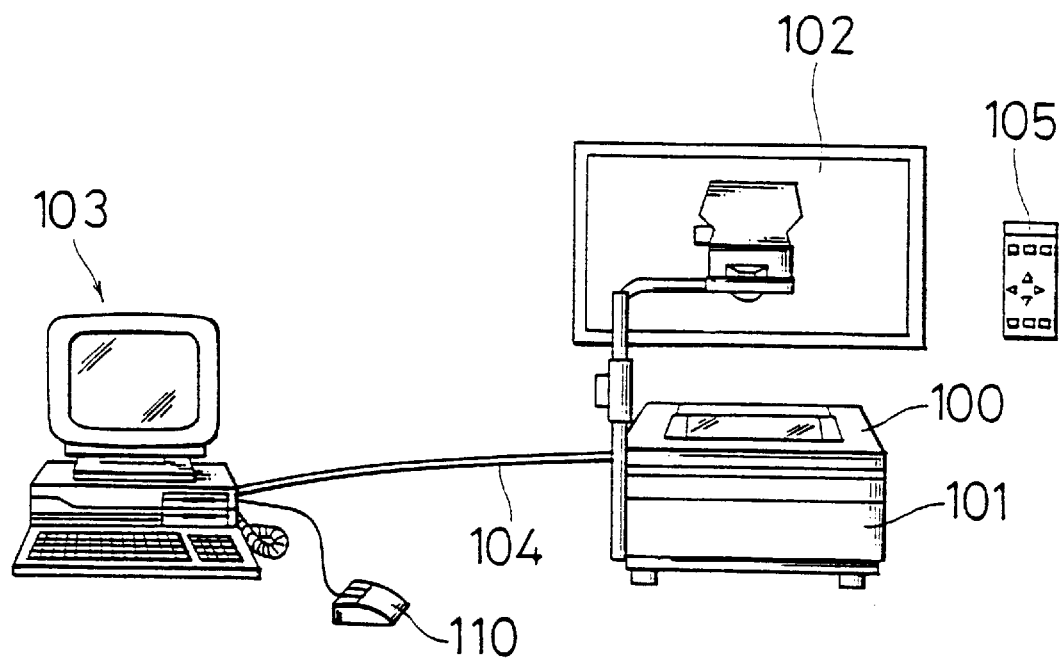
FIG. 25 is a view for explaining an engaged state of a conventional liquid crystal projection apparatus.
Figure 26:
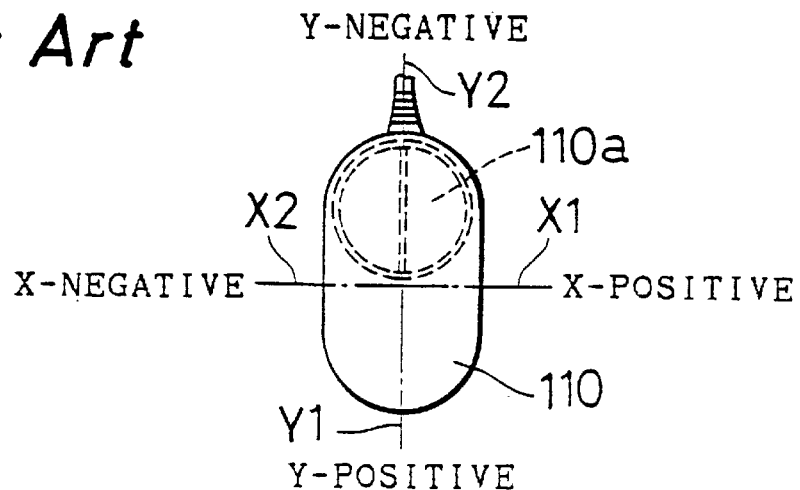
FIG. 26 is a plane view of a conventional mouse 110.
Figure 27:
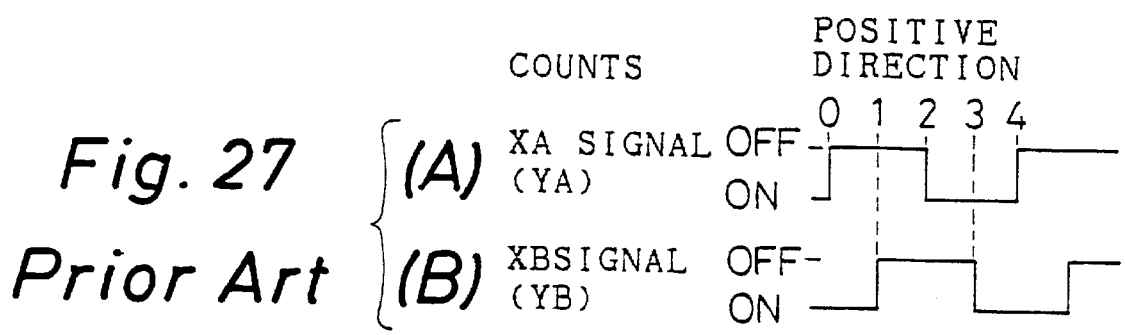
FIGS. 27A–27D are output signal diagrams showing moving directions of the mouse 110.
Figure 27:
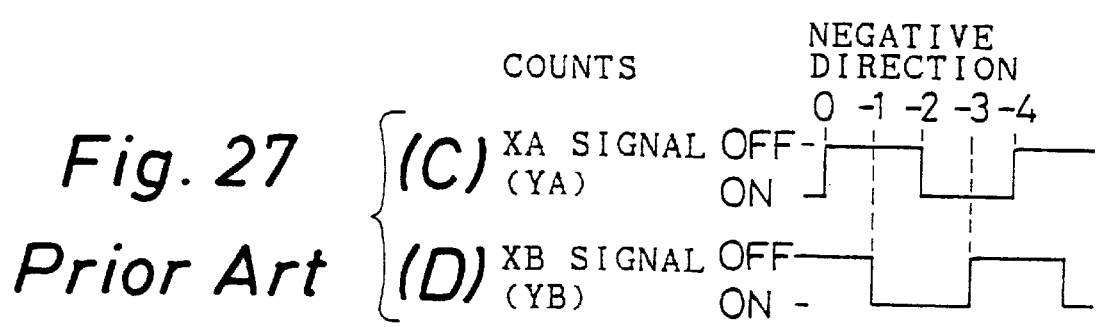
Figure 30:
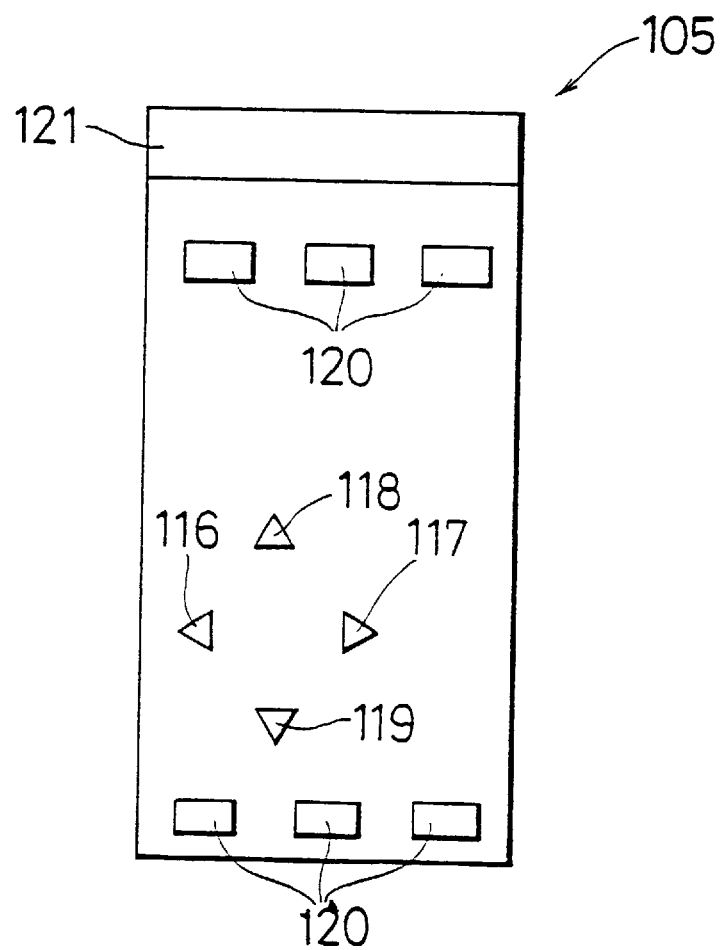
FIG. 30 is a plane view of a conventional remote controller 105.
Figure 31:
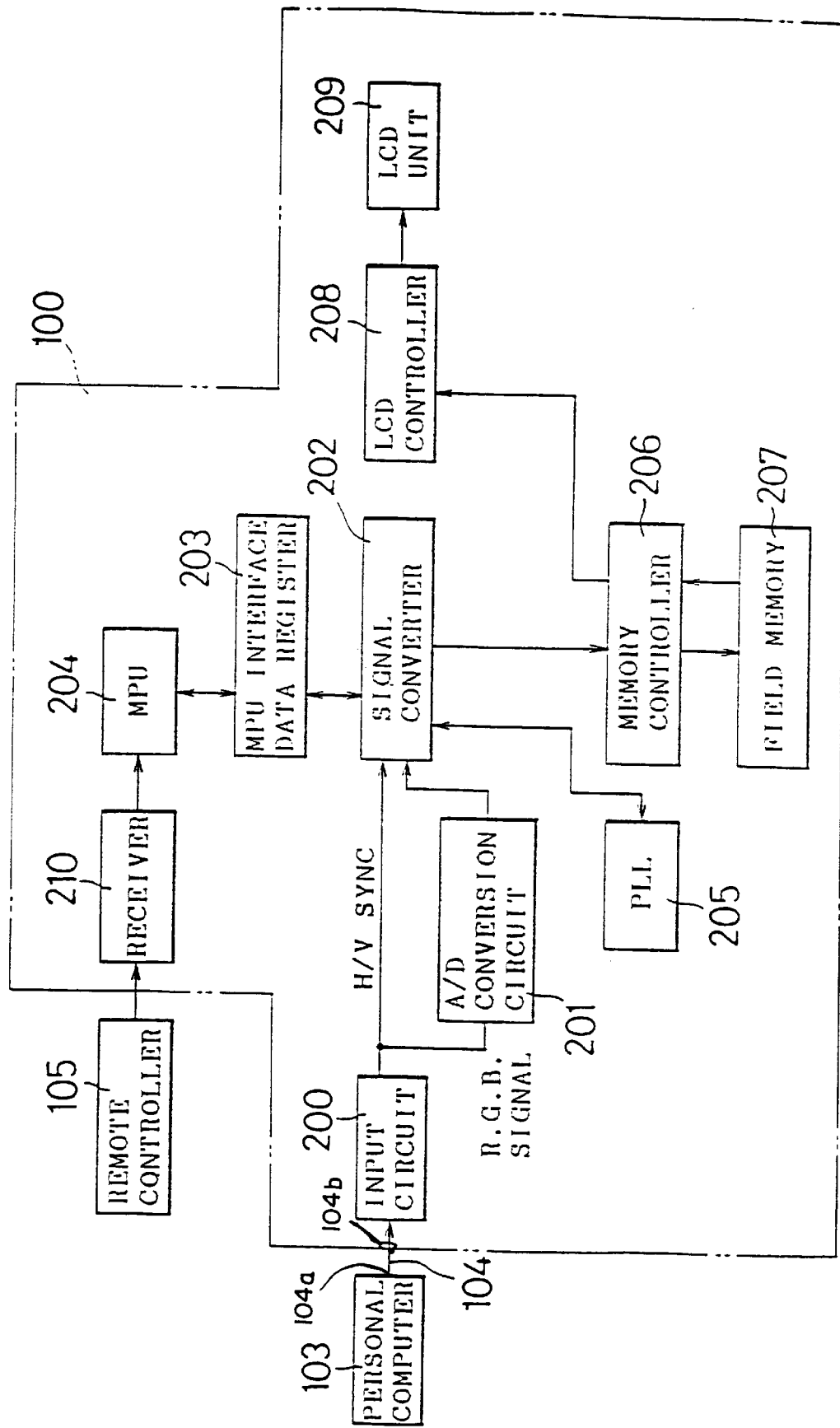
FIG. 31 is a block diagram showing an electrical configuration of a conventional liquid crystal projection apparatus.

FIG. 24 is a graph showing a stress-resistance characteristic of the joy stick 80. The stress and resistance are in inverse proportion.

The above description relates to the case that the movement of the cursor with the remote controller is represented by four kinds of signals divided into four directions X(+), X(−), Y(+), Y(−). Namely, when the movements in all directions are detected, the number of kinds of signals reaches nine, which are (0,0), (X(+),0), (X(+), Y(+)), (X(+), Y(−)), (X(−),0), (X(−), Y(+)), (X(−), Y(−)), (0, Y(+)), (0,Y(−)). Consequently, a plurality of mouse signals are stored in the ROM 63 in accordance with the nine kinds of signals.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal projection apparatus comprising:

a main body that is connected to an image signal source, which generates an image signal on the basis of a predetermined signal, and displays an image based on the image signal from the image signal source; and a remote controller for controlling the display condition of an image displayed on the main body, wherein the remote controller possesses operation means for controlling the image signal source and signal outputting means for transmitting an operational signal in response to an output from the operation means, the main body possesses control means which receives the operational signal from the remote controller, which converts the operational signal to a control signal, that controls the connected image signal source, and which sends the control signal to the image signal source, and the image signal source and the main body are connected via two cables, where the main body receives the image signal from the signal source via one of the two cables and sends the control signal to the image signal source via the other of the two cables.

2. The apparatus of claim 1, wherein the control means includes signal conversion means for converting the operational signal to the control signal corresponding to the connected image source to be connected and for output timing of the control signal and regulation means for regulating the output level of the control signal; and wherein the signal conversion means specifies a type of image signal source to be connected on the basis of a level of the received image signal to convert the operational signal from the remote controller to a control signal of a level corresponding to the specified type of image signal source.

3. The apparatus of claim 2, wherein the signal conversion means includes:

a processing unit that receives the operational signal from the remote controller and level information of the received image signal from the image source to be connected;

an operative memory, being interconnected to the processing unit, in which is stored control signal data representative of control signals for one or more types of image sources;

an output control circuit being interconnected to the operative memory and the regulation means;

output timing circuitry being interconnected to the output control circuit and being configured so as to provide timing signals;

wherein the processing unit provides outputs to the operative memory representative of the operational signal and the type of image source so the operative memory outputs to the output circuit, from the stored control signal data, the control signal corresponding to the operational signal received from the remote controller for the type of image source; and wherein the output control circuit is configured to output the control signal to the regulation means responsive to signals from the output timing circuitry.

4. The apparatus of claim 3, wherein the output control circuit is configured so as to have a plurality of signal output ports from which is outputted a control signal and wherein the regulation means includes a plurality of buffers, where there is one buffer for each signal port.

5. The apparatus of claim 3, wherein the operative memory is interconnected to the output timing circuitry and is configured so the control signal is outputted from the operative memory to the output control circuit responsive to a signal from the output timing circuitry.

6. The apparatus of claim 2, wherein the signal conversion means includes:
   a processing unit that receives the operational signal from the remote controller and level information of the received image signal from the image source to be connected;
   an operative memory, being interconnected to the processing unit, in which is stored control signal data representative of control signals for one or more types of image sources;
   an output control circuit being interconnected to the operative memory, the processing unit and the regulation means;
   wherein the processing unit provides outputs to the operative memory representative of the operational signal and the type of image source so the operative memory outputs to the output circuit, from the stored control signal data, the control signal corresponding to the operational signal received from the remote controller for the type of image source;
   wherein the processing unit includes means for generating output timing signals that are provided to the output control circuit; and
   wherein the output control circuit is configured to output the control signal to the regulation means responsive to the output timing signals from the processing means.

7. The apparatus of claim 2, wherein the signal conversion means includes a processing unit that receives the operational signal from the remote controller and level information of the received image signal from the image source to be connected and in which is stored control signal data representative of control signals for one or more types of image sources; wherein the processing unit is interconnected to the regulation means; and wherein the processing unit using the received operational signal and the level information of the received image signal, selects from the stored control signal data, the control signal corresponding to the operational signal received from the remote controller for the type of image source and outputs the selected control signal to the regulation means.

8. The apparatus of claim 2, wherein the regulation means includes at least one buffer that modulates the level of the control signal being outputted over one of the cables to the image signal source.

9. The apparatus of claim 8, wherein the signal conversion means includes a plurality of signal ports from which is outputted a control signal and wherein the regulation means includes a plurality of buffers, where there is one buffer for each signal port.

10. The apparatus of claim 1, wherein the operation means possesses a plurality of operation buttons whose output signal levels depend on electrical conductivity or non-conductivity between two electrodes.

11. The apparatus of claim 10, wherein the operation means includes detection means for converting a mechanically applied pressure to an electrical signal and outputting the electrical signal.

12. The apparatus of claim 1, wherein the image signal source is a personal computer which generates the image signal on the basis of a mouse signal from connected direction means, and the control means of the main body converts the operational signal from the remote controller to the mouse signal and sends the mouse signal to the personal computer.

13. The apparatus of claim 1, wherein the signal outputting means includes:
   operational signal formatting and transmitting means for formatting the operational signal being transmitted in the form of a multi-bit digital signal, where a first bit group therefore sets an address, where a second bit group therefore provides the execution contents corresponding to certain input from the operation means, where a third bit group therefore expands the contents of the second bit group responsive to other input from the operation means, where a fourth bit group therefore indicates a transmitting form of the digital signals representative of the bits in the second and third bit groups, and where a fifth bit group therefore sets a bit for checking; and
   wherein the operational signal formatting and transmitting means includes means for selectively setting the contents of the fourth bit group to the intended transmitting form and for transmitting the operational signal to the control means in the intended transmitting form.

14. The apparatus of claim 1, wherein the image signal source to be connected is a personal computer and wherein the control means includes control signal formatting and transmission means for formatting the control signal in the form of a mouse signal, having a start bit, a stop bit, a parity bit and a data bit group, and for controlling the transmission of the control signal to the image signal source so a control signal is transmitted when a level for both of a clock signal and the control signal are above a predetermined value.

15. The apparatus of claim 1, wherein the remote controller includes:
   a transmitter that is configured so signals transmitted therefrom are received by the control means of the main body;
   a plurality of keys;
   a plurality of buttons;
   wherein the plurality of buttons and keys are selectively interconnected to each other so a combination of one of the keys and one of the buttons along with the actuation of one of them generates an output signal to control the display condition of the image displayed on the main body; and
   wherein the generated output signal is communicated to the transmitter for transmission as the operational signal to the control means of the main body.

16. The apparatus of claim 1, wherein the remote controller includes
   a LCD display;
   a pen;
   a transmitter that is configured so signals transmitted therefrom are received by the control means of the main body;
   a display control and output means for generating and image on the LCD display, for determining the relative position of the light pen with respect to the LCD display and for providing an output signal that is representative of the relative position of the light pen to the transmitter.

17. The apparatus of claim 16, wherein the display control and output means includes:
- a liquid crystal driving circuit being configured to provide signals, including an image signal, to the liquid crystal display so a predetermined image is displayed thereon;
- an X/Y coordinate detection circuit being configured to detect the directed position of an element of the displayed image on the basis of the image signal and a direction signal with the pen;
- a variation detection circuit being configured to detect a variation in the directed position using position data periodically read out of the X/Y coordinate detection circuit; and
- a signal conversion circuit being configured to covert the detected variation into a signal that is outputted by the transmitter as the operational signal to the control means.

18. The apparatus of claim 1, wherein the remote controller includes a joystick and a signal transmission line interconnecting the main body control means and the joystick, wherein the joystick includes a stick portion that is responsive to and detects the pressure and direction applied thereto by an operator and converts the detected pressure and direction to electrical signals for transmission over the signal transmission line to the control means.

19. The apparatus of claim 18, wherein the joystick further includes:
- a signal conversion circuit being configured to convert the detected pressure and direction into electrical signals representative of the X and Y position of the stick portion;
- first and second processors;
- a plurality of input switches interconnected to the second microprocessor;
- a photodiode circuit being configured to selectively output an IR signal, receivable by the control means, responsive to signals from the second microprocessor;
- wherein the first microprocessor receives the electrical signal representative of the X and Y position from the signal conversion circuit and coverts the electrical signals into data signals and clock signal outputs that are inputted to the second microprocessor;
- wherein the second microprocessor, responsive to inputs from one of the first microprocessor and the plurality of switches, provides output signals to selectively operate the photodiode circuit, where the IR signal outputted by the photodiode circuit is the operational signal.

* * * * *